United States Patent
Jenni et al.

(10) Patent No.: US 12,061,668 B2
(45) Date of Patent: Aug. 13, 2024

(54) EQUIVARIANT MODELS FOR GENERATING VECTOR REPRESENTATIONS OF TEMPORALLY-VARYING CONTENT

(71) Applicant: ADOBE INC., San Jose, CA (US)

(72) Inventors: Simon Jenni, Wangen bei Olten (CH); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 358 days.

(21) Appl. No.: 17/466,636

(22) Filed: Sep. 3, 2021

(65) Prior Publication Data

US 2023/0075087 A1 Mar. 9, 2023

(51) Int. Cl.
| | |
|---|---|
| G06F 18/213 | (2023.01) |
| G06F 18/214 | (2023.01) |
| G06F 18/2413 | (2023.01) |
| G06N 3/045 | (2023.01) |
| G06N 3/08 | (2023.01) |

(52) U.S. Cl.
CPC .......... *G06F 18/213* (2023.01); *G06F 18/214* (2023.01); *G06F 18/2413* (2023.01); *G06N 3/045* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,236,006 B1* | 3/2019 | Gurijala | .................. | G10L 19/02 |
| 10,360,735 B1* | 7/2019 | Reeder | .................... | G06T 7/001 |
| 10,678,508 B2* | 6/2020 | Vantrease | .............. | G06F 7/5095 |
| 10,783,622 B2* | 9/2020 | Wang | ........................ | G06T 5/70 |
| 2013/0129151 A1* | 5/2013 | Rodriguez Serrano | ..................... | G06V 10/772 382/105 |
| 2019/0373264 A1* | 12/2019 | Chong | .................... | H04N 19/91 |
| 2021/0027620 A1* | 1/2021 | Luk-Zilberman | ....... | G06N 3/045 |
| 2022/0301262 A1* | 9/2022 | Aksit | ....................... | G06N 3/08 |

OTHER PUBLICATIONS

Wu, Zuxuan, et al. "Exploring inter-feature and inter-class relationships with deep neural networks for video classification." Proceedings of the 22nd ACM international conference on Multimedia. 2014. (Year: 2014).*

(Continued)

*Primary Examiner* — Michelle M Entezari Hausmann
(74) *Attorney, Agent, or Firm* — Shook, Hardy & Bacon L.L.P.

(57) ABSTRACT

The disclosed invention includes systems and methods for training and employing equivariant models for generating representations (e.g., vector representations) of temporally-varying content, such as but not limited to video content. The trained models are equivariant to temporal transformations applied to the input content (e.g., video content). The trained models are additionally invariant to non-temporal transformations (e.g., spatial and/or color-space transformations) applied to the input content. Such representations are employed in various machine learning tasks, such as but not limited to video retrieval (e.g., video search engine applications), identification of actions depicted in video, and temporally ordering clips of the video.

20 Claims, 9 Drawing Sheets

(56) References Cited

OTHER PUBLICATIONS

Duan, Haodong, et al. "Transrank: Self-supervised video representation learning via ranking-based transformation recognition." Proceedings of the IEEE/CVF conference on computer vision and pattern recognition. 2022. (Year: 2022).*

Jenni, Simon, Markus Woodson, and Fabian Caba Heilbron. "VideoReTime: Learning Temporally Varying Speediness for Time Remapping." arXiv preprint arXiv:2205.05609 (2022). (Year: 2022).*

Dave, Ishan Rajendrakumar, Simon Jenni, and Mubarak Shah. "No More Shortcuts: Realizing the Potential of Temporal Self-Supervision." Proceedings of the AAAI Conference on Artificial Intelligence. vol. 38. No. 2. 2024. (Year: 2024).*

Ni, Jingcheng, et al. "Motion sensitive contrastive learning for self-supervised video representation." European Conference on Computer Vision. Cham: Springer Nature Switzerland, 2022. (Year: 2022).*

Dave, Ishan Rajendrakumar, et al. "Timebalance: Temporally-invariant and temporally-distinctive video representations for semi-supervised action recognition." Proceedings of the IEEE/CVF Conference on Computer Vision and Pattern Recognition. 2023. (Year: 2023).*

Patrick, M., Asano, Y. M., Kuznetsova, P., Fong, R., Henriques, J. F., Zweig, G., & Vedaldi, A. (2020). Multi-modal self-supervision from generalized data transformations. arXiv preprint arXiv:2003.04298.

Qian, R., Meng, T., Gong, B., Yang, M. H., Wang, H., Belongie, S., & Cui, Y. (2021). Spatiotemporal contrastive video representation learning. In Proceedings of the IEEE/CVF Conference on Computer Vision and Pattern Recognition (pp. 6964-6974).

Schindler, K., & Van Gool, L. (Jun. 2008). Action snippets: How many frames does human action recognition require?. In 2008 IEEE Conference on Computer Vision and Pattern Recognition (pp. 1-8). IEEE.

Soomro, K., Zamir, A. R., & Shah, M. (2012). UCF101: A dataset of 101 human actions classes from videos in the wild. arXiv preprint arXiv:1212.0402.

Sun, C., Baradel, F., Murphy, K., & Schmid, C. (2019). Learning video representations using contrastive bidirectional transformer. arXiv preprint arXiv:1906.05743.

Tao, L., Wang, X., & Yamasaki, T. (2020). Pretext-Contrastive Learning: Toward Good Practices in Self-supervised Video Representation Leaning. arXiv preprint arXiv:2010.15464.

Tran, D., Wang, H., Torresani, L., Ray, J., LeCun, Y., & Paluri, M. (2018). A closer look at spatiotemporal convolutions for action recognition. In Proceedings of the IEEE conference on Computer Vision and Pattern Recognition (pp. 6450-6459).

Wang, J., Jiao, J., Bao, L., He, S., Liu, W., & Liu, Y. H. (2021). Self-supervised video representation learning by uncovering spatio-temporal statistics. IEEE Transactions on Pattern Analysis and Machine Intelligence.

Wang, J., Jiao, J., & Liu, Y. H. (Aug. 2020). Self-supervised video representation learning by pace prediction. In European conference on computer vision (pp. 504-521). Springer, Cham.

Wang, L., Xiong, Y., Wang, Z., Qiao, Y., Lin, D., Tang, X., & Van Gool, L. (Oct. 2016). Temporal segment networks: Towards good practices for deep action recognition. In European conference on computer vision (pp. 20-36). Springer, Cham.

Wang, X., & Gupta, A. (2015). Unsupervised learning of visual representations using videos. In Proceedings of the IEEE international conference on computer vision (pp. 2794-2802).

Wang, X., Liu, Z., & Yu, S. X. (2021). Unsupervised Feature Learning by Cross-Level Instance-Group Discrimination. In Proceedings of the IEEE/CVF Conference on Computer Vision and Pattern Recognition (pp. 12586-12595).

Wei, D., Lim, J. J., Zisserman, A., & Freeman, W. T. (2018). Learning and using the arrow of time. In Proceedings of the IEEE Conference on Computer Vision and Pattern Recognition (pp. 8052-8060).

Worrall, D. E., Garbin, S. J., Turmukhambetov, D., & Brostow, G. J. (2017). Harmonic networks: Deep translation and rotation equivariance. In Proceedings of the IEEE Conference on Computer Vision and Pattern Recognition (pp. 5028-5037).

Wu, Z., Xiong, Y., Yu, S. X., & Lin, D. (2018). Unsupervised feature learning via non-parametric instance discrimination. In Proceedings of the IEEE conference on computer vision and pattern recognition (pp. 3733-3742).

Xiao, T., Wang, X., Efros, A. A., & Darrell, T. (2020). What should not be contrastive in contrastive learning. arXiv preprint arXiv:2008.05659.

Xie, S., Sun, C., Huang, J., Tu, Z., & Murphy, K. (2018). Rethinking spatiotemporal feature learning: Speed-accuracy trade-offs in video classification. In Proceedings of the European conference on computer vision (ECCV) (pp. 305-321).

Xu, D., Xiao, J., Zhao, Z., Shao, J., Xie, D., & Zhuang, Y. (2019). Self-supervised spatiotemporal learning via video clip order prediction. In Proceedings of the IEEE/CVF Conference on Computer Vision and Pattern Recognition (pp. 10334-10343).

Xue, F., Ji, H., Zhang, W., & Cao, Y. (2020). Self-supervised video representation learning by maximizing mutual information. Signal Processing: Image Communication, 88, 115967.

Yao, Y., Liu, C., Luo, D., Zhou, Y., & Ye, Q. (2020). Video playback rate perception for self-supervised spatio-temporal representation learning. In Proceedings of the IEEE/CVF Conference on Computer Vision and Pattern Recognition (pp. 6548-6557).

Zhang, L., Qi, G. J., Wang, L., & Luo, J. (2019). Aet vs. aed: Unsupervised representation learning by auto-encoding transformations rather than data. In Proceedings of the IEEE/CVF Conference on Computer Vision and Pattern Recognition (pp. 2547-2555).

Zhang, R., Isola, P., & Efros, A. A. (Oct. 2016). Colorful image colorization. In European conference on computer vision (pp. 649-666). Springer, Cham.

Zhang, R., Isola, P., & Efros, A. A. (2017). Split-brain autoencoders: Unsupervised learning by cross-channel prediction. In Proceedings of the IEEE Conference on Computer Vision and Pattern Recognition (pp. 1058-1067).

Zhuang, C., Zhai, A. L., & Yamins, D. (2019). Local aggregation for unsupervised learning of visual embeddings. In Proceedings of the IEEE/CVF International Conference on Computer Vision (pp. 6002-6012).

Kay, W., Carreira, J., Simonyan, K., Zhang, B., Hillier, C., Vijayanarasimhan, S., . . . & Zisserman, A. (2017). The kinetics human action video dataset. arXiv preprint arXiv:1705.06950.

Abu-El-Haija, S., Kothari, N., Lee, J., Natsev, P., Toderici, G., Varadarajan, B., & Vijayanarasimhan, S. (2016). Youtube-8m: A large-scale video classification benchmark. arXiv preprint arXiv:1609.08675.

Afouras, T., Owens, A., Chung, J. S., & Zisserman, A. (2020). Self-supervised learning of audio-visual objects from video. In Computer Vision—ECCV 2020: 16th European Conference, Glasgow, UK, Aug. 23-28, 2020, Proceedings, Part XVIII 16 (pp. 208-224). Springer International Publishing.

Alwassel, H., Mahajan, D., Korbar, B., Torresani, L., Ghanem, B., & Tran, D. (2019). Self-supervised learning by cross-modal audio-video clustering. arXiv preprint arXiv:1911.12667.

Bai, Y., Fan, H., Misra, I., Venkatesh, G., Lu, Y., Zhou, Y., . . . & Yuille, A. (2020). Can Temporal Information Help with Contrastive Self-Supervised Learning?. arXiv preprint arXiv:2011.13046.

Benaim, S., Ephrat, A., Lang, O., Mosseri, I., Freeman, W. T., Rubinstein, M., . . . & Dekel, T. (2020). Speednet: Learning the speediness in videos. In Proceedings of the IEEE/CVF Conference on Computer Vision and Pattern Recognition (pp. 9922-9931).

Brattoli, B., Buchler, U., Wahl, A. S., Schwab, M. E., & Ommer, B. (2017). Lstm self-supervision for detailed behavior analysis. In Proceedings of the IEEE conference on computer vision and pattern recognition (pp. 6466-6475).

Buchler, U., Brattoli, B., & Ommer, B. (2018). Improving spatiotemporal self-supervision by deep reinforcement learning. In Proceedings of the European conference on computer vision (ECCV) (pp. 770-786).

(56) References Cited

OTHER PUBLICATIONS

Caron, M., Bojanowski, P., Joulin, A., & Douze, M. (2018). Deep clustering for unsupervised learning of visual features. In Proceedings of the European Conference on Computer Vision (ECCV) (pp. 132-149).
Caron, M., Misra, I., Mairal, J., Goyal, P., Bojanowski, P., & Joulin, A. (2020). Unsupervised learning of visual features by contrasting cluster assignments. arXiv preprint arXiv:2006.09882.
Chen, T., Kornblith, S., Norouzi, M., & Hinton, G. (Nov. 2020). A simple framework for contrastive learning of visual representations. In International conference on machine learning (pp. 1597-1607). PMLR.
Chen, X., & He, K. (2021). Exploring simple siamese representation learning. In Proceedings of the IEEE/CVF Conference on Computer Vision and Pattern Recognition (pp. 15750-15758).
Cho, H., Kim, T., Chang, H. J., & Hwang, W. (2020). Self-supervised spatio-temporal representation learning using variable playback speed prediction. arXiv preprint arXiv:2003.02692.
Choi, J., Gao, C., Messou, J. C., & Huang, J. B. (2019). Why Can't I Dance in the Mall? Learning to Mitigate Scene Bias in Action Recognition. arXiv preprint arXiv:1912.05534.
Cohen, T., & Welling, M. (Jun. 2016). Group equivariant convolutional networks. In International conference on machine learning (pp. 2990-2999). PMLR.
Dave, I., Gupta, R., Rizve, M. N., & Shah, M. (2021). TCLR: Temporal Contrastive Learning for Video Representation. arXiv preprint arXiv:2101.07974.
Devlin, J., Chang, M. W., Lee, K., & Toutanova, K. (2018). Bert: Pre-training of deep bidirectional transformers for language understanding. arXiv preprint arXiv:1810.04805.
Hjelm, R. D., & Bachman, P. (2020). Representation learning with video deep infomax. arXiv preprint arXiv:2007.13278.
Doersch, C., Gupta, A., & Efros, A. A. (2015). Unsupervised visual representation learning by context prediction. In Proceedings of the IEEE international conference on computer vision (pp. 1422-1430).
Dosovitskiy, A., Fischer, P., Springenberg, J. T., Riedmiller, M., & Brox, T. (2015). Discriminative unsupervised feature learning with exemplar convolutional neural networks. IEEE transactions on pattern analysis and machine intelligence, 38(9), 1734-1747.
Epstein, D., Chen, B., & Vondrick, C. (2020). Oops! predicting unintentional action in video. In Proceedings of the IEEE/CVF conference on computer vision and pattern recognition (pp. 919-929).
Fernando, B., Bilen, H., Gavves, E., & Gould, S. (2017). Self-supervised video representation learning with odd-one-out networks. In Proceedings of the IEEE conference on computer vision and pattern recognition (pp. 3636-3645).
Gidaris, S., Singh, P., & Komodakis, N. (2018). Unsupervised representation learning by predicting image rotations. arXiv preprint arXiv:1803.07728.
Gordon, D., Ehsani, K., Fox, D., & Farhadi, A. (2020). Watching the world go by: Representation learning from unlabeled videos. arXiv preprint arXiv:2003.07990.
Grill, J. B., Strub, F., Altché, F., Tallec, C., Richemond, P. H., Buchatskaya, E., . . . & Valko, M. (2020). Bootstrap your own latent: A new approach to self-supervised learning. arXiv preprint arXiv:2006.07733.
Han, T., Xie, W., & Zisserman, A. (2019). Video representation learning by dense predictive coding. In Proceedings of the IEEE/CVF International Conference on Computer Vision Workshops (pp. 0-0).
Han, T., Xie, W., & Zisserman, A. (2020). Memory-augmented dense predictive coding for video representation earning. In Computer Vision—ECCV 2020: 16th European Conference, Glasgow, UK, Aug. 23-28, 2020, Proceedings, Part III 16 (pp. 312-329). Springer International Publishing.
Han, T., Xie, W., & Zisserman, A. (2020). Self-supervised co-training for video representation learning. arXiv preprint arXiv:2010.09709.
Hara, K., Kataoka, H., & Satoh, Y. (2018). Can spatiotemporal 3d cnns retrace the history of 2d cnns and imagenet?. In Proceedings of the IEEE conference on Computer Vision and Pattern Recognition (pp. 6546-6555).
He, K., Fan, H., Wu, Y., Xie, S., & Girshick, R. (2020). Momentum contrast for unsupervised visual representation learning. In Proceedings of the IEEE/CVF Conference on Computer Vision and Pattern Recognition (pp. 9729-9738).
Hinton, G. E., Krizhevsky, A., & Wang, S. D. (Jun. 2011). Transforming auto-encoders. In International conference on artificial neural networks (pp. 44-51). Springer, Berlin, Heidelberg.
Hinton, G. E., Sabour, S., & Frosst, N. (Feb. 2018). Matrix capsules with EM routing. In International conference on learning representations.
Jenni, S., & Favaro, P. (2018). Self-supervised feature learning by learning to spot artifacts. In Proceedings of the IEEE Conference on Computer Vision and Pattern Recognition (pp. 2733-2742).
Jenni, S., Jin, H., & Favaro, P. (2020). Steering self-supervised feature learning beyond local pixel statistics. In Proceedings of the IEEE/CVF Conference on Computer Vision and Pattern Recognition (pp. 6408-6417).
Jenni, S., Meishvili, G., & Favaro, P. (2020). Video representation learning by recognizing temporal transformations. In Computer Vision—ECCV 2020: 16th European Conference, Glasgow, UK, Aug. 23-28, 2020, Proceedings, Part XXVIII 16 (pp. 425-442). Springer International Publishing.
Jing, L., Yang, X., Liu, J., & Tian, Y. (2018). Self-supervised spatiotemporal feature learning via video rotation prediction. arXiv preprint arXiv:1811.11387.
Kim, D., Cho, D., & Kweon, I. S. (Jul. 2019). Self-supervised video representation learning with space-time cubic puzzles. In Proceedings of the AAAI Conference on Artificial Intelligence (vol. 33, No. 01, pp. 8545-8552).
Korbar, B., Tran, D., & Torresani, L. (2018). Cooperative learning of audio and video models from self-supervised synchronization. arXiv preprint arXiv:1807.00230.
Kuehne, H., Jhuang, H., Garrote, E., Poggio, T., & Serre, T. (Nov. 2011). HMDB: a large video database for human motion recognition. In 2011 International conference on computer vision (pp. 2556-2563). IEEE.
Larsson, G., Maire, M., & Shakhnarovich, G. (2017). Colorization as a proxy task for visual understanding. In Proceedings of the IEEE Conference on Computer Vision and Pattern Recognition (pp. 6874-6883).
Lee, H. Y., Huang, J. B., Singh, M., & Yang, M. H. (2017). Unsupervised representation learning by sorting sequences. In Proceedings of the IEEE International Conference on Computer Vision (pp. 667-676).
Lenc, K., & Vedaldi, A. (2015). Understanding image representations by measuring their equivariance and equivalence. In Proceedings of the IEEE conference on computer vision and pattern recognition (pp. 991-999).
Li, Y., Li, Y., & Vasconcelos, N. (2018). Resound: Towards action recognition without representation bias. In Proceedings of the European Conference on Computer Vision (ECCV) (pp. 513-528).
Loshchilov, I., & Hutter, F. (2016). Sgdr: Stochastic gradient descent with warm restarts. arXiv preprint arXiv:1608.03983.
Loshchilov, I., & Hutter, F. (2017). Decoupled weight decay regularization. arXiv preprint arXiv:1711.05101.
Luo, D., Liu, C., Zhou, Y., Yang, D., Ma, C., Ye, Q., & Wang, W. (Apr. 2020). Video cloze procedure for self-supervised spatio-temporal learning. In Proceedings of the AAAI Conference on Artificial Intelligence (vol. 34, No. 07, pp. 11701-11708).
Miech, A., Alayrac, J. B., Smaira, L., Laptev, I., Sivic, J., & Zisserman, A. (2020). End-to-end learning of visual representations from uncurated instructional videos. In Proceedings of the IEEE/CVF Conference on Computer Vision and Pattern Recognition (pp. 9879-9889).
Misra, I., Zitnick, C. L., & Hebert, M. (Oct. 2016). Shuffle and learn: unsupervised learning using temporal order verification. In European Conference on Computer Vision (pp. 527-544). Springer, Cham.

(56) References Cited

OTHER PUBLICATIONS

Noroozi, M., & Favaro, P. (Oct. 2016). Unsupervised learning of visual representations by solving jigsaw puzzles. In European conference on computer vision (pp. 69-84). Springer, Cham.

Owens, A., Wu, J., McDermott, J. H., Freeman, W. T., & Torralba, A. (Oct. 2016). Ambient sound provides supervision for visual learning. In European conference on computer vision (pp. 801-816). Springer, Cham.

Pathak, D., Krahenbuhl, P., Donahue, J., Darrell, T., & Efros, A. A. (2016). Context encoders: Feature learning by inpainting. In Proceedings of the IEEE conference on computer vision and pattern recognition (pp. 2536-2544).

* cited by examiner

EQUIVARIANT MODELS FOR GENERATING VECTOR REPRESENTATIONS OF TEMPORALLY-VARYING CONTENT

BACKGROUND

Machine learning (ML) is increasingly applied to a wide variety of computational tasks, (e.g., machine vision-related tasks). Many applications of ML involve training a model (e.g., often implemented by a neural network (NN) architecture) to generate a relatively-low dimensional vector representation of relatively-high dimensional input data (e.g., image data). For example, NNs (e.g., 2D convolutional neural networks (CNNs)) have been trained to encode static images (e.g., image data comprising of around 1 megapixels that encodes an image or a single frame of video content) as vectors in dimensionality ranging from hundreds to thousands of components. Once embedded within a vector-space, the vector representations of images may be employed to perform various machine vision tasks, such as but not limited to image classification, by comparing the vector with other vectors representing other content in the vector space. In many instances, a CNN may be trained via supervised-learning (SL) techniques that require hundreds or even thousands of examples of manually-labeled images (e.g., hand-labeled training datasets).

To reduce the burden of generating labeled training datasets, in recent years, self-supervised learning (SSL) techniques, such as "contrastive" learning techniques have been devised to train CNNs to generate vector representations of images. In contrastive-learning scenarios, rather than hand-labeled training data, a CNN may be presented with multiple "versions" of the same "seed" image. That is, a set of input transformations is employed to generate variance in multiple instances of the same "seed" image. Thus, a varied training dataset may be automatically generated from a multiple "seed" images, where the training dataset includes multiple (but varied via different input transformations) instances of the same "seed" image. Thus, each "seed" image may serve as a labeled "class" of training images. The CNN is trained (via a loss function that is targeted to decrease one or more "errors") to generate vector representations of the multiple versions of the same "seed" image, such that the corresponding vector representations are confined to a relatively small (and simply connected) region (e.g., a sub-space) of "similarity" in the vector space (e.g., the model's manifold).

For example, to generate a varied training dataset, various transforms (e.g., image croppings, shifts, boosts, rotations, reflections (e.g., point inversion), color jittering, and the like) may be applied to each image in a "seed" image dataset. Training images generated by the same "seed" image (but with different croppings, reflections, color jittering, and the like) may be automatically labeled with the same label. Training images generated by different "seed" images may be labeled with different labels. A CNN may be trained to generate "similar" vectors for training images generated from the same "seed" image (e.g., different transforms applied to the same "seed" image), and "dissimilar" vectors for training images generated from different "seed" images.

It may be said that such contrastive learning generates models that are "invariant" to the class of transforms that are employed to generate the variance in the training datasets. That is, the trained models generate similar (e.g., approximately invariant) vectors for two input static images that were generated from different transformations (e.g., of the set of input transformations that we employed to generate variance in the training data set) applied to the same "seed" image. However, such contrastive learning methods, which generate invariant models, may not be robust enough to generate meaningful vector representations for content that varies temporally. For example, forcing a model to be invariant to temporal transformations (e.g., time shifts) in video content (e.g., an ordered sequence of static images) may not generate vector representations that adequately capture the dynamics (e.g., action-oriented sequences) inherent to video content.

SUMMARY

The technology described herein is directed towards methods, systems, and architecture for training and employing models for generating vector representations of content. The content may vary in one or more domains. The models may be equivariant to transformations in one or more of the domains. As discussed throughout, equivariance is a generalization of the concept of invariance. However, in contrast to invariance, the vector representations generated by the equivariant models discussed herein may be robust enough to encode a greater dynamical-range of variance within content. The embodiments may be directed towards self-supervised learning (SSL) methods that train representational models to be equivariant to one or more domains, such as but not limited to a temporal domain. For example, the content may be temporally-varying content, such as but not limited to video content. The models may be equivariant to temporal transformations of the content and invariant to non-temporal transformations of the content. The models may be trained via enhanced SSL methods, such as but not limited to contrastive learning methods. The training may generate a model that is equivariant to a temporal domain, and invariant to one or more non-temporal domains, such as one or more spatial domains. The equivariance in the models is not limited to a temporal domain, and the training methods disclosed herein may be generalized to generate equivariance to non-temporal domains. For example, the methods may be employed to generate equivariance to spatial transformations applied to the content.

In one embodiment, a training method includes receiving a set of temporally-varying training content. The method may be an iterative method, where a single iteration of the methods includes generating a set of training content pairs. Each pair of the set of training content pair may include two separate training contents from the set of training content. Each training content of the set of training content may be included in a single training content pair. A separate pair of temporal transformations (from a set of temporal transformations) may be associated with each training content pair of the set of training content pairs. A separate pair of non-temporal transformations (from a set of non-temporal transformations) may be associated with each training content of the set of training content. For each iteration of the method, the pairings of the training content, associating the pairs of temporal transformations to the content pairs, and associating the non-temporal transformations to the training contents may be subject to a random and/or stochastic process and may vary during each iteration. That is, the pairing of the training content, as well as the associating of temporal and non-temporal transformations may be (pseudo-)randomly re-shuffled for each iteration of the method, until the model converges to a stable model.

During an iteration of the method, and for each training content pair of the set of training content pairs, two versions of each training content is generated based on an application of the associated pair of temporal transformations. For each training content pair, each of the two versions of each of the training contents is updated based on an application of the associated non-temporal transformation. For each training content pair, a vector representation is generated for each updated version of each training content of the content pair based on a representational model. The representational model may be implemented by a 3D convolutional neural network (e.g., a CNN). For each training content pair, a concatenated vector is generated for each training content of the content pair is generated based on a combination (e.g., a concatenation) of the vector representations of each training content. For each training content pair, a relative transformation vector may be generated for each training content of the pair based on a multilayer perceptron (MLP) model and the concatenated vector for the training content. The weights of both the representational and MLP models may be updated based on a contrastive learning loss function. The contrastive learning loss function may be updated to "attract" pairs of relative transformation vectors associated with training content included in the same content pair and "repel" pairs of relative transformation vectors associated with training content that are not included in the same content pair. The method may be iterated until the weights of the models converge to stable values.

DETAILED DESCRIPTION

Figure 1A:
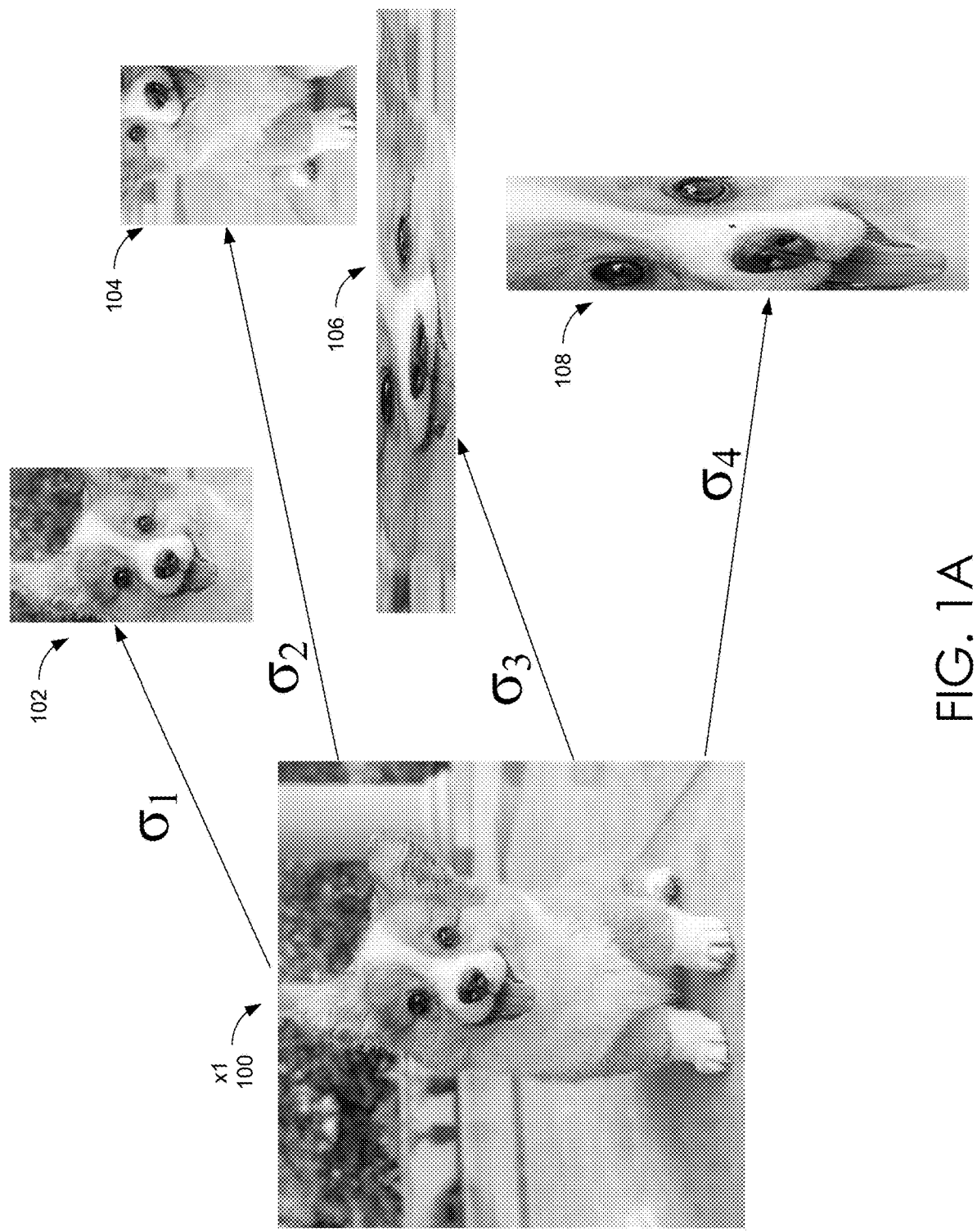
FIG. 1A illustrates non-limiting examples of non-temporal transformations applied to input content, according to various embodiments.

The embodiments are directed towards systems and methods that enable equivariant models for generating representations (e.g., vector representations) of temporally-varying content, such as but not limited to video content. Systems and methods are presented for training representational models that are equivariant to at least some class of transformations applied to content. The content may be temporally-varying content (e.g., video content). In such embodiments, the models may be equivariant to temporal transformations (e.g., time shifts). However, the embodiments may not be so limited, and the trained models may be equivariant to non-temporal transformations, such as but not limited to spatial transformations, color transformations, and the like. The trained models may additionally be invariant to other classes of transformations, such as non-temporal transformations (e.g., spatial and/or color-space transformations) applied to the input content. Such representations may be employed in various machine learning tasks, such as but not limited to video retrieval (e.g., video search engine applications) and identification of actions depicted in video content.

Invariance generally refers to a symmetrical property of an operation (e.g., a function that generates a vector representation of an input object), with respect to one or more classes of transformations. A function (e.g., as implemented by a model) is generally a mapping from a domain to a codomain. For an invariant function, when a symmetry group (corresponding to the symmetry class of the invariance) operates on an element of the function's domain, the codomain's corresponding element remains unchanged (e.g., the operation of the symmetry group on the function's domain does change the mapping from the domain to the codomain). As used throughout, equivariance may refer to a generalization of the concept of invariance. An equivariant function (with respect to a class of transformation) may be a mapping, where the same symmetry group (corresponding to the relevant transformation class) acts on both the function's domain and codomain. Furthermore, the symmetry group may commute with the equivariant function. That is, applying the transformation to the domain element and then computing the function (determining the corresponding codomain element) is (at least approximately) equivalent to computing the function on the domain element and then applying the transformation to determine the corresponding codomain element.

In contrast to conventional systems that generate vector representations for static images, the various embodiments generate vector representations for content that varies across a temporal domain, e.g., a temporally ordered sequence of images or frames. In the embodiments, a single vector may be generated that represents the video content across multiple frames, whereas in conventional systems, a separate vector may be required to represent each static image (e.g., a frame) of the temporally-varying content. The single vector representing multi-frames of content may encode the dynamic-evolution of actions depicted across the multiple frames. Conventional systems that encode a single frame with a vector may fail to encode such temporal dynamics. In additional to encoding dynamical properties of temporally varying content, the embodiments employ contrastive learning (e.g., a form of self-supervised learning) to train the equivariant models. Accordingly, in further contrast to many conventional systems, the various embodiments do not require the (often manual) effort to create labeled training data sets, as many conventional (e.g., supervised learning) training methods require.

Although contrastive learning has been previously employed to generate representational models for static images, these models lack the temporal aspect included in the various embodiments. Furthermore, even if conventional learning is applied to temporally-varying content, such conventional contrastive learning may fail to encode the dynamical aspects encoded in the input content. Conventional contrastive learning may generate invariant models. That is, the models generated by conventional contrastive learning may be invariant to the non-temporal transformations that are employed to introduce variance into the training dataset. An invariant model would not encode the dynamic progression of action across multiple frames of video content.

The various embodiments employ contrastive learning to generate equivariant models, where the vector representations encode the dynamics of video content. Due to the equivariant nature of the models, the embodiments are enabled to distinguish between different temporal transformations applied to the same content. In contrast, conventional models are invariant to different transformations applied to the same content. The set of temporal transformations applied to the training dataset (e.g., of "seed" video content) may include temporal shifts and/or temporal croppings, as well as playback speed and playback direction. In some embodiments, the equivariant models are enabled to classify a temporal-ordering of multiple temporal transformations of the same video content. For example, various embodiments may temporally-order two temporally-transformed versions of video content (e.g., separate clips of the same video: clip A and clip B). Such embodiments may determine whether if clip A occurs before clip B (or vice-versa), and whether there is a temporal overlap in the two clips.

The various embodiments employ a contrastive approach to training representational models that exhibit equivariance to a set or class of input transformations, such as but not limited to a set of temporal transformation. A function (as implemented by the model) may be said to be equivariant to the set of transformation, when each transformation of the set of transformation corresponds to an element of a symmetry group associated with both of the function's domain and codomains, and the operation (or affect) of the elements of the symmetry group commute with the (operation) of the function. Thus, an equivariant function may be said to be implemented by an equivariant model. More specifically, a relative temporal transformation between two samples of training content is encoded in a feature-vector. During training, the feature vector for each sample may be contrasted with each other (e.g., the pair of vectors is associated as a positive-contrastive vector pair). When separate relative temporal transformations are applied to samples of training content, the resulting features vectors are associated with one another as negative-contrastive vector pairs. During training, the representational model (generating the feature vectors) is updated (e.g. the weights of the model are adjusted), such that the individual vectors of a positive-contrastive pair of vectors are attracted to one another and the individual vectors of a negative-contrastive pair are repelled to one another.

Training the models and the equivariance of the models will now be discussed. In general, let $\mathcal{D} = \{x_1, x_2, x_3, \ldots x_N\}$ be a finite set of content. In non-limiting embodiments, each element of $\mathcal{D}$ may be temporally-varying content (e.g., a video clip). The set $\mathcal{D}$ may be referred to as the training dataset. A representational model (e.g., F) may be trained (via contrastive learning) to map each element of $\mathcal{D}$ onto an D-dimensional flat (e.g., Euclidean) manifold (e.g., $\mathbb{R}^D$). That is, $F(x_i) = \mathbb{R}^D$, for $\forall x_i \in \mathcal{D}$. The D-dimensional manifold may be referred to feature-vector space and/or the feature space. Accordingly, the mapping (generated by the model F) between the set $\mathcal{D}$ and the feature space may be referred to as the feature mapping. The representational model may be implemented by one or more neural networks (NNs), such as but not limited to a convolutional neural network (CNN). Because the content includes a temporal dimension (and each frame includes two spatial dimensions), the CNN may be a 3D CNN. Let $\mathcal{T}$ represent a set of temporal transformations applicable to the elements of $\mathcal{S}$. If the elements of the set $\mathcal{T}$ are discrete, the elements of $\mathcal{T}$ may be ordered and indexed as: $\tau_i$. If the elements of the set $\mathcal{T}$ are not discrete, the elements of $\mathcal{T}$ may be referenced as: $\tau_\Theta$, where $\Theta \in \mathcal{R}^D$ is a set of parameters parameterizing the elements. The notation employed is not meant to imply that the dimensionality of the parameter space is equivalent to the dimensionality of the feature space. Let $\mathcal{S}$ represent a set of non-temporal transformations applicable to the elements of $\mathcal{D}$. If the elements of the set $\mathcal{S}$ are discrete, the elements of $\mathcal{S}$ may be ordered and indexed as: $\sigma_i$. If the elements of the set $\mathcal{S}$ are not discrete, the elements of $\mathcal{S}$ may be referenced as: $\sigma_\Theta$, where $\Theta \in \mathcal{R}^D$ is a set of parameters parameterizing the elements.

The various embodiments are employed to train the representational model to be equivariant to a set of temporal transformations applied to the input content. In some embodiments, the model is trained to be invariant to the set of non-temporal transformations applied to the input content. The invariance of F to the set of non-temporal transformations may be expressed as: $\forall x_i \in \mathcal{D}$ and $\forall \sigma_j \in \mathcal{S}$: $F(\sigma_j(x_i)) \approx F(x_i)$. The equivariance of F to the set of temporal transformations may be expressed as: $\forall x_i \in \mathcal{D}$ and $\forall \tau_j \in \mathcal{T}$: $F(\tau_j(x_i)) \approx \bar{\tau}_j(F(x_i))$, where $\bar{\tau}_j \in \bar{\mathcal{T}}$, $\bar{\mathcal{T}}$ is a set of transformations applicable to the feature space of the model (e.g., ($\bar{\mathcal{T}}$: $\mathbb{R}^D \to \mathbb{R}^D$)), and $\tau_j$ and $\bar{\tau}_j$ are corresponding transformations in their respective sets of transformations. In the various embodiments, $\bar{\tau}_j$ may be identified given the vector-pair $(F(x_i), F(\tau_j(x_i)))$, irrespective of the input element $(x_i)$ employed to generate the vector pair. That is, the map or correspondence between $\tau_1$ and $\bar{\tau}_j$ is not dependent upon the content being transformed and/or being embedded in the feature space. In various embodiments, the model is trained to generate (or recognize) the relative transformation between $\tau_i(x)$ and $\tau_j(x)$, for two arbitrary transformation: $\tau_i$, $\tau_j \in \mathcal{T}$, which is independent of the input content. Because the set of transformations $\bar{\mathcal{T}}$ are transformations in the feature space manifold, $\mathcal{T}$ may be referred to as the set of feature space transformations.

Turning to FIG. 1A, FIG. 1A illustrates non-limiting examples of non-temporal transformations applied to input content 100, according to various embodiments. Input content 100 includes a static image, which may be a "seed" content or "seed" image for contrastive learning methods. Input content 100 may be a single frame from temporally varying content (e.g., video content). Four non-temporal transformations: $\{\sigma_1, \sigma_2, \sigma_3, \sigma_4\} \in \mathcal{S}$ are applied on the input content 100 to generate four additional (e.g., contrastive) input images: first image 102, second image 104, third image 106, and fourth image 108. Non-temporal transformations $\mathcal{S}$ may include any transformation applied to input image 100 (or any other single frame of video content), such as but not limited spatial-croppings, rotations, inversions, reflections, color transformations (e.g., color jitterings), tone mappings, and the like. In the various embodiments, the representational models may be trained to be invariant to non-temporal transformations included in the set of non-temporal transformation ($\mathcal{S}$). That is, the vector representations (generated via the representational model F) of each of input content 100, first image 102, second image 104, third image 106, and fourth image 108 are all confined to a relatively small (and simply connected) subspace of the manifold: $\mathbb{R}^D$, where, due to the invariance of the representational model, $F(x) \approx F(\sigma(x)) \in \mathbb{R}^D$.

Figure 1B:
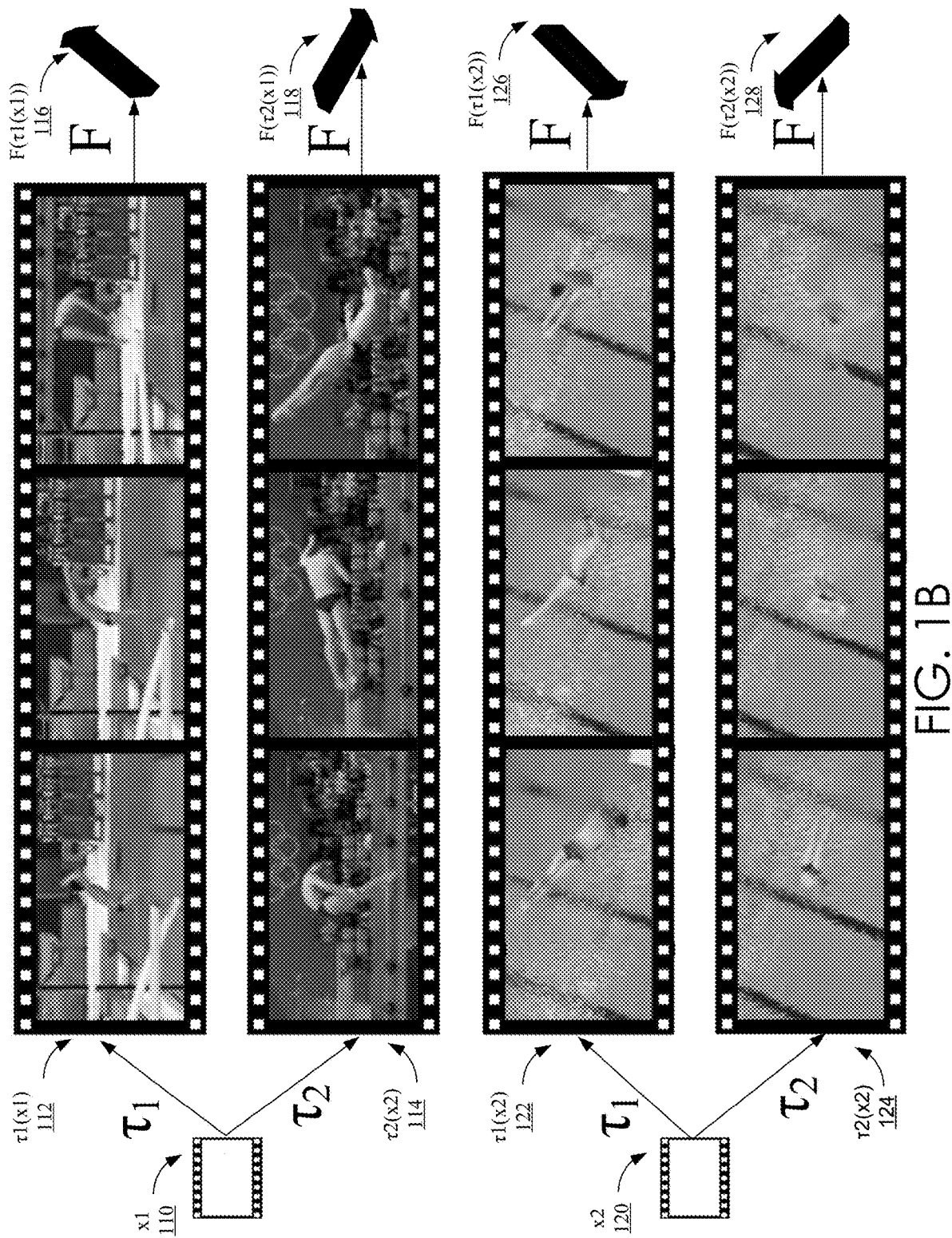
FIG. 1B illustrates non-limiting examples of temporal transformations applied to non-limiting examples of temporally-varying content, according to various embodiments.

FIG. 1B illustrates non-limiting examples of temporal transformations applied to non-limiting examples of temporally-varying content, according to various embodiments. First input content 110 and second input content 120 may be temporally-varying content (e.g., video content). In the non-limiting examples shown in FIG. 1B, each of the first input content 110 and second input content 120 may include video depicting an individual performing a diving-related action via a diving board and a diving pool. First input content 110 may be referred to as $x_1$ and second input content may be referred to as $x_2$. A first temporal transformation ($\tau_1 \in \mathcal{T}$) is applied to each of the first input content 110 and second input content 120, generating first version 112 of first input content 110 and first version 122 of second input content 120. A second temporal transformation ($\tau_2 \in \mathcal{T}$) is applied to each of the first input content 110 and second input content 120, generating second version 114 of first input content 110 and second version 124 of second input content 120.

In the non-limiting embodiments shown in FIG. 1B, each of $\tau_1$ and $\tau_2$, when applied to the input content 110/120, generate temporally-shifted "clips" (112, 114, 122, and 124) of the corresponding input content 110/120. That is, each of $\tau_1$ and $\tau_2$ are temporally-shifted "clip" style transformations. Other temporal transformations are considered, such as playback speed, playback direction, and the like. For example, see FIG. 1C. Note that each of temporally-varying contents 110, 112, 114, 120, 122, and 124 are "video clips," where video clips 112 and 114 are "sub-clips" of first input content 110 and video clips 122 and 124 are "sub-clips" of second input content 120. There is a temporal shift between sub-clip 112 and sub-clip 114. The same temporal shift exists between sub-clip 122 and sub-clip 124. This temporal shift is a relative temporal transformation between video clips 112 and 114 (as well as between video clips 122 and 124). Because these video sub-clips 112/114/122/124 are generated by applying a temporal transformation (e.g., $\tau_1$ or $\tau_2$) on $x_1$ or $x_2$, first sub-clip 112 may be referenced as $\tau_1(x_1)$, the second sub-clip 114 may be referenced as $\tau_2(x_1)$, the third sub-clip 122 may be referenced as $\tau_1(x_2)$, and the fourth video sub-clip 114 may be referenced as $\tau_2(x_2)$.

The embodiments are enabled to generate vector representations of each of first input content 110, first sub-clip 112, second sub-clip 114, second input content 120, third sub-clip 122, and fourth sub-clip 124, via the application of the representational model F. The vector representation of the first sub-clip 112 is shown as first vector 116 and may be referenced as $F(\tau_1(x_1))$. The vector representation of the second sub-clip 114 is shown as second vector 118 and may be referenced as $F(\tau_2(x_1))$. The vector representation of the third sub-clip 122 is shown as third vector 126 and may be referenced as $F(\tau_1(x_2))$. The vector representation of the fourth sub-clip 124 is shown as fourth vector 128 and may be referenced as $F(\tau_2(x_z))$.

Note that due to the equivariance of F, there is a set of feature space transformations ($\bar{\mathcal{T}}$) of the feature space of F, including $\bar{\tau}_1, \bar{\tau}_2 \in \bar{\mathcal{T}}$, such that $F(\tau_1(x_1)) \approx \bar{\tau}_1(F(x_1))$, $F(\tau_2(x_1)) \approx \bar{\tau}_2(F(x_1))$, $F(\tau_1(x_2)) \approx \bar{\tau}_1(F(x_2))$, and $F(\tau_2(x_2)) \approx \bar{\tau}_2(F(x_2))$. Note that the relative temporal transformation between $\tau_1$ and $\tau_2$ corresponds to the shift in feature space between first vector 116 and second vector 118 (as well as a similar shift between third vector 126 and 128). Accordingly, there is a transformation in the set of feature space transformations ($\bar{\tau}_{1 \to 2} \in \bar{\mathcal{T}}$) that corresponds to the temporal transformation $\tau_{1 \to 2}$, such that $\tau_{1 \to 2}(F(\tau_1(x_1))) \approx \bar{\tau}_2(F(x_1)) \approx F(\tau_2(x_1))$ and $\tau_{1 \to 2}(F(\tau_1(x_2))) \approx \bar{\tau}_2(F(x_2)) \approx F(\tau_2(x_2))$. Note that the behavior of transformations in feature space are independent of the input content (e.g., $x_1$ and $x_2$).

In various embodiments, the model is trained to recognize and/or detect the mapping (or correspondence) between the temporal transformations of the set of temporal transformations (e.g., $\mathcal{T}$) and the feature space transformations of the set of feature space transformations (e.g., $\bar{\mathcal{T}}$). More specifically, the training of the model F enables the recognition (or identification) of at least the relative transformations, in each of the temporal space and the feature space. For example, given two temporal transformations of the same video content (e.g., $\tau_1(x_1)$, $\tau_2(x_1)$), some embodiments may be enabled to recognize and/or identify (as well as classify) the corresponding transformations $\tau_{1 \to 2}$ and/or $\bar{\tau}_{1 \to 2}$. More, specifically, a temporal ordering of first sub-clip 112 and second sub-clip 114 (both sub-clips of first input content 110) is such that first sub-clip 112 occurs prior to second sub-clip 114 with no overlap between the sub-clips 112/114, and that each are temporal transformations of first input content 110. Similarly, a temporal ordering of third sub-clip 122 and fourth sub-clip 124 (both sub-clips of second input content 120) is such that third sub-clip 122 occurs prior to fourth sub-clip 124 with no overlap between the sub-clips 122/124, and that each are temporal transformations of second input content 120. Due to the equivariance of the representation model F, the embodiments are enabled to recognize and/or identify the relative temporal shift (e.g., $\tau_2 - \tau_1$) based on a comparison of the vector representations of the first sub-clip 112 and the second sub-clip 114. Note that the shift (e.g., $\mathbb{R}^D$) between from the vector representation of the first sub-clip 112 and the second sub-clip 114 is generated via the relative transformation's corresponding element in $\bar{\mathcal{T}}$. The embodiments are also enabled to recognize that the same relative temporal transformation has been applied to each of the first input content 110 and the second input content, based on the corresponding vector representations.

Figure 1C:
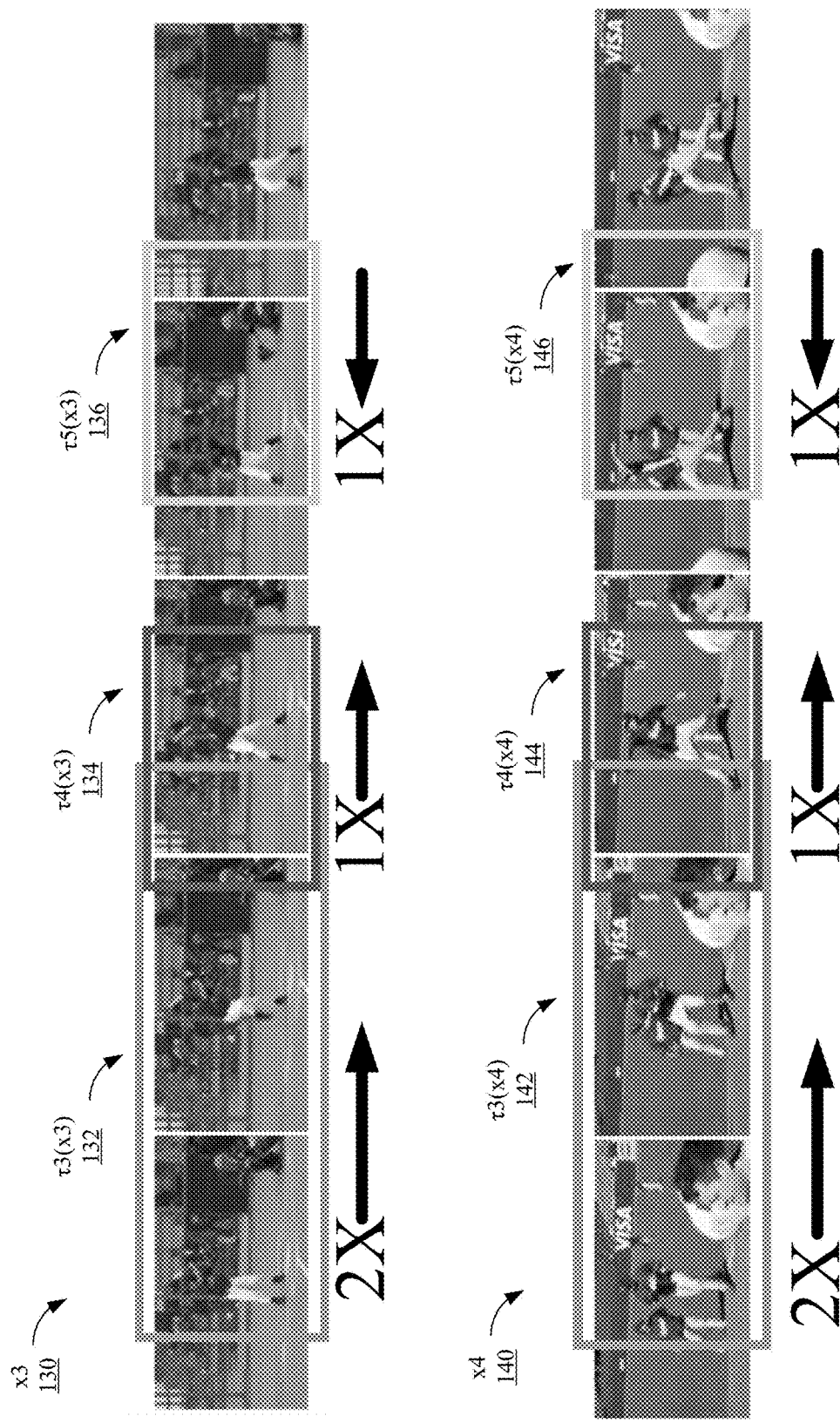
FIG. 1C illustrates additional non-limiting examples of temporal transformations applied to non-limiting examples of temporally-varying content, according to various embodiments.

FIG. 1C illustrates additional non-limiting examples of temporal transformations applied to non-limiting examples of temporally-varying content, according to various embodiments. Third input content 130 and fourth input content 140 may be temporally-varying content (e.g., video content). In the non-limiting examples shown in FIG. 1C, each of the third input content 130 and fourth input content 140 may include video depicting a baseball game. Third input content 130 may be referred to as $x_3$ and fourth input content may be referred to as $x_3$. In FIG. 1C, "video clips" generated by temporal transformations are indicated by the "clipping" boxes shown in $x_3$ 130 and $x_4$ 140. A third temporal transformation ($\tau_3 \in \mathcal{T}$) is applied to each of the third input content 130 and fourth input content 130, generating a first version 132 (e.g., $\tau_3(x_3)$ 132) of third input content 130 and a first version 142 (e.g., $\tau_3(x_4)$) of fourth input content 140. A fourth temporal transformation ($\tau_4 \in \mathcal{T}$) is applied to each of the third input content 130 and fourth input content 140, generating a second version 134 (e.g., $\tau_4(x_3)$ 134) of third input content 130 and a second version 144 (e.g., $\tau_4(x_4)$ 144) of fourth input content 140. A fifth temporal transformation ($\tau_5 \in \mathcal{T}$) is applied to each of the third input content 130 and fourth input content 140, generating a third version 136 (e.g., $\tau_5(x_3)$ 136) of third input content 130 and a third version 146 (e.g., $\tau_5(x_4)$ 146) of fourth input content 140.

In additional to generating a temporal "crop" of $x_3$ 130 and $x_4$ 140, $\tau_3 \in \mathcal{T}$ transforms the playback speed of each of $x_3$ 130 and $x_4$ 140 from "normal" (e.g., 1×) to twice the playback speed (as indicated by the 2× markings in FIG. 1C). Due to the increased playback speed, $\tau_3(x_3)$ 132 and $\tau_3(x_4)$ 142 may have an increased number of frames, as compared to other clips of a "1×" playback speed. The arrows pointing to the right for each of $\tau_3(x_3)$ 132 and $\tau_3(x_4)$ 142 indicate that $\tau_3$ does not generate a transformation (e.g., a reversal) in the playback direction As shown in FIG. 1C, the application of $\tau_4 \in \mathcal{T}$ generates a temporal crop (that is shifted to the "right" of the temporal crop of $\tau_3$) in each of $x_3$ 130 and $x_4$ 140, but does not transform the playback speed nor the playback direction. The direction arrows pointing to left of $\tau_5(x_3)$ 136 and $\tau_5(x_4)$ 146 indicate that in addition to generating a temporal crop (that shifted to the "right" of the temporal crops of $\tau_3$ and $\tau_4$), $\tau_5 \in \mathcal{T}$ generates a reversal of playback direction in each of $\tau_5(x_3)$ 136 and $\tau_5(x_4)$ 146. Due to equivariance of F, $F(\tau_5(x_3)) \approx F(\tau_5(x_4))$. As discussed below, the training of the model F enables the identification and/or detection of relative temporal transformations, e.g., $\tau_{3 \to 4}$, $\tau_{3 \to 5}$, and $\tau_{4 \to 5}$. As noted, corresponding transformations in feature space exist that corresponds to the relative temporal transformations, e.g., $\bar{\tau}_{3 \to 4}$, $\bar{\tau}_{3 \to 5}$, $\bar{\tau}_{4 \to 5} \in \bar{\mathcal{T}}$.

Figure 2:
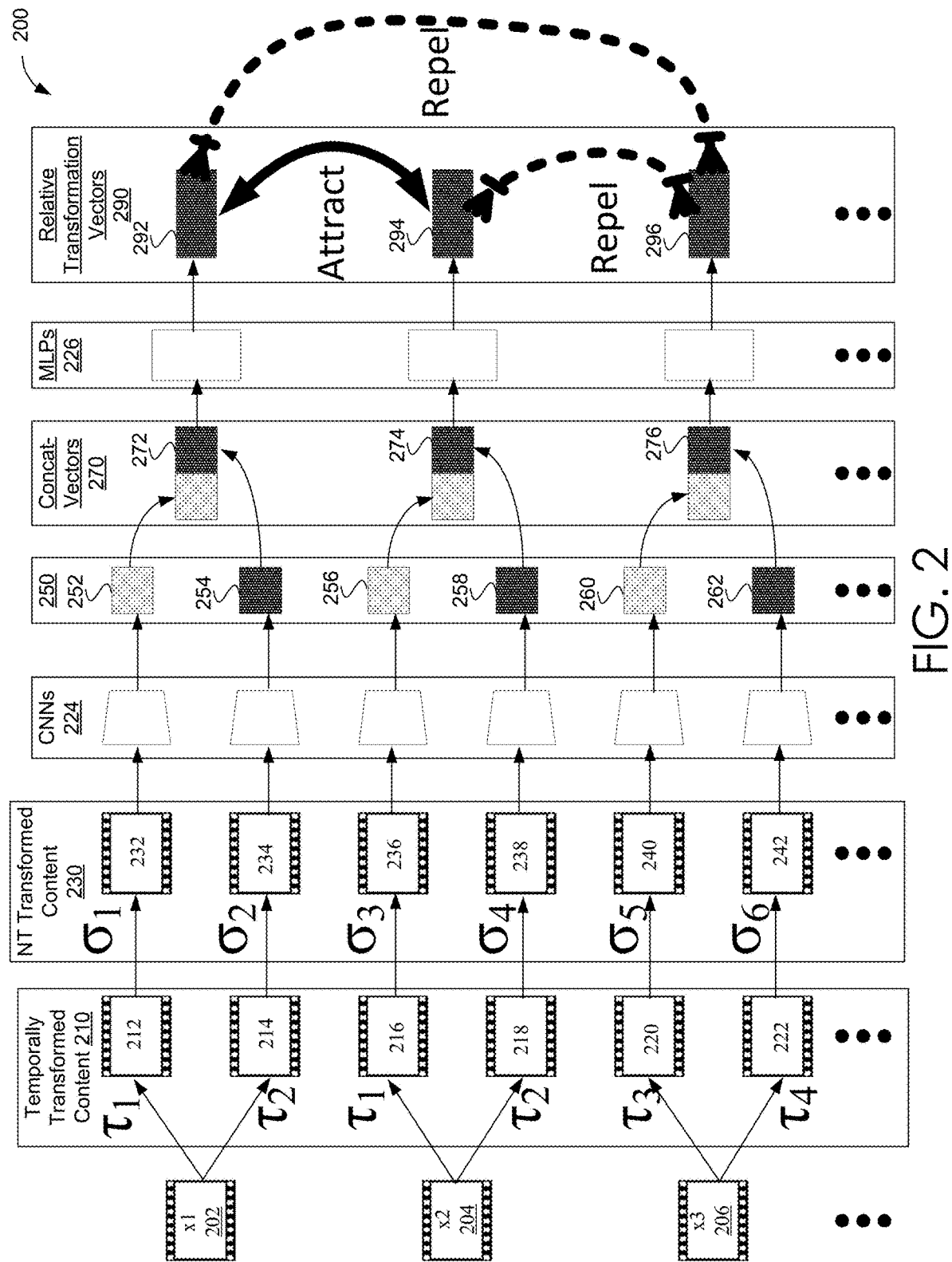
FIG. 2 illustrates a non-limiting architecture for training equivariant models, in accordance to various embodiments.

FIG. 2 illustrates a non-limiting architecture 200 for training equivariant models, in accordance to various embodiments. To train an equivariant model (e.g., F), architecture may receive, as input, a set of training "seed" content that is temporally-varying. Such training "seed" content may include, but is not limited to, video content. Three samples from the set of training content are shown in FIG. 2: $x_1$ 202, $x_2$ 204, and $x_3$ 206, which may be interchangeably referred to as first training content 202, second training content 204, and third training content 206 Throughout, the training "seed" contents may be referred to as first input content 202, second input content 204, and third input content 206. Each of $x_1$ 202, $x_2$ 204, and $x_3$ 206 may be video content, or a video clip. Note that the set of training content may include many additional video clips, as designated by the set of vertical dots. In various embodiments, the set of training content includes M separate contents, thus the training contents may be referenced via an integer index i, ranging from 1 to M, e.g., $x_1$.

The equivariant model is primarily implemented by a set of convolutional neural networks (CNNs) 224 and/or a set of multilayer perceptrons (MLPs) 226). Because each frame of each input content may be a 2D array of pixel values, and each frame of each training content represents a separate temporal slice of the training content, each CNN of the set of CNNs 224 may be a 3D CNN. In various embodiments, the set of CNNs 224 may include only a single copy of a CNN, and the "fan-out" display illustrated in FIG. 2 is shown to demonstrate the training architecture. In other embodiments, the set of CNNs 224 may include multiple copies (of identical CNNs), that are iteratively updated together (e.g., a "serial" architecture and/or training pipeline). The same alternative "serial" or "parallel" architectures/pipelines (e.g., the fan-out architecture shown in FIG. 2) are possible for the set of MPLs 226.

As noted throughout, once trained, the model is equivariant to a set of temporal transformations (e.g., $\mathcal{T}$) applicable to the elements of the set of input content and invariant to a set of non-temporal transformations (e.g., $\mathcal{S}$) also applicable to each element of the set of input content. The application of four temporal transformations (e.g., $\tau_1, \tau_2, \tau_3, \tau_4 \in \mathcal{T}$) of the set of temporal transformations are shown in FIG. 2. The set of temporal transformations may include additional transformations. For example, the set of temporal transformations may include N temporal transformations and may be indexed via index j, ranging from 1 to N, $\tau_j \in \mathcal{T}$, where $1 \le j \le N$. The application of six non-temporal transformations (e.g., $\sigma, \sigma_2, \sigma_3, \sigma_4, \sigma_5, \sigma_6 \in \mathcal{S}$) of the set of non-temporal transformations are shown in FIG. 2. The set of non-temporal transformations may include additional transformations. For example, the set of non-temporal transformations may include L non-temporal transformations and may be indexed via index k, ranging from 1 to L, $\sigma_k \in \mathcal{S}$, where $1 \le k \le L$. Additional temporal and non-temporal transformations may be applied to additional samples of the set of training content, as indicated by the ellipses.

The models are trained iteratively via contrastive learning methods. As such, training the models includes iteratively updating the weights of the various neural networks (e.g., the set of CNNs 224 and the set of MLPs 226) via backpropagation techniques. The weights are adjusted to iteratively decrease a "loss" or "error" function that is defined in pairs of vectors. The loss functions employed are contrastive loss functions that increase (or decrease) a similarity metric for pairs of vectors generated by the models. Pairs of vectors that the model updates generate an increase in their similarity metric may be referred to as a "positive-contrastive vector pair." Pairs of vectors that the model's iterative updates generate a decrease in their similarity metric may be referred to as a "negative-contrastive vector pair." The models are trained via a relative temporal transformation (e.g., $\tau_{1 \to 2}, \tau_{3 \to 4} \in \mathcal{T}$) applied to pairs of input content. As noted throughout, the models are trained to recognize and/or identify the corresponding relative transformations in feature space (e.g., $\bar{\tau}_{1 \to 2}, \bar{\tau}_{3 \to 4} \in \bar{\mathcal{T}}$) based on content that has been temporally transformed by the corresponding relative temporal transformations, e.g., $\tau_{1 \to 2}$ and $\tau_{3 \to 4}$ respectively. In various embodiments, the models are trained to make the inverse inference. That is, the trained models may recognize and/or identify the relative temporal transformations, via transformations (e.g., rotations, reflections, inversions, or displacements) in the feature space.

The models are trained in pairs of training contents (e.g., positive-contrastive pairs or negative contrastive pairs). For some pairs of training contents (e.g., positive-contrastive pairs of content), a same relative temporal transformations is applied each content of the pair. For other pairs of training contents (e.g., negative-contrastive pairs of content), different relative temporal transformations re applied to each content of the pair. Content pairs with the same applied relative temporal transformation (e.g., $\tau_{1 \to 2}$) are employed to generate positive-contrastive pairs of vectors. Content pairs with different applied relative temporal transformations (e.g., $\tau_{1 \to 2}$ and $\tau_{3 \to 4}$) are employed to generate negative-contrastive pairs of vectors.

More specifically, two separate temporal transformations (e.g., $\tau_1$ and $\tau_2$) are applied to a first training content (e.g., $x_1$ 202) to generate two separate versions (e.g., two temporally-transformed versions) of the first training content. A vector for each version of the first training content is generated (via the representational model F implemented by the set of CNNs 224). The two vectors are combined (via concatenation) to generate a single combined and/or concatenated vector associated for the two versions of the first training content. The single concatenated vector (e.g., concatenated vector 272) represents a transformation in feature space (e.g., $\bar{\tau}_{1 \to 2}$) corresponding to the relative temporal transformation $\tau_{1 \to 2}$. The same two temporal transformations are applied to a second training content (e.g., $x_2$ 204). A single combined and/or concatenated vector (e.g., concatenated vector 274) for the two versions of the second training content is generated in a similar fashion. These two concatenated vectors (a first concatenated vector associated with the first and second versions of the first content and a second concatenated vector associated with the first and second versions of the second content) are employed as a positive-contrastive pair of vectors.

Two other temporal transformations (e.g., $\tau_3$ and $\tau_4$) are applied to a third training content (e.g., $x_3$ 206) and a single combined and/or concatenated vector representation (e.g., concatenated vector 276) of the two versions of the third training content is generated. The concatenated vector associated with the two versions of the first content is paired with the concatenated vector associated with two versions of the third content to generate a negative-contrastive vector pair. Likewise, the concatenated vector associated with the two versions of the second content is paired with the concatenated vector associated with two versions of the third content to generate another negative-contrastive vector pair. This pattern of generating multiple versions of content (with additional pairings of additional temporal transformations from the set of temporal transformations) is continued to generate additional positive-contrastive and negative-contrastive pairs of vectors. The set of weights associated with the model is updated to "attract" the positive-contrastive pairs (e.g., increase the similarity metric between the pair) and to "repel" the negative-contrastive pairs (e.g., decrease the similarity metric between the pair) via the contrastive-learning loss function. The details of the training, via architecture 200 will now be discussed.

From the set of training content, including but not limited to $x_1$ 202, $x_2$ 204, and $x_3$ 206, a set of temporally transformed content 210 is generated, via the application of temporal transformations from the set of temporal transformations. In the non-limiting example shown in FIG. 2, two versions of $x_1$ 202 are generated via the application of two temporal transformations (e.g., $\tau_1$ and $\tau_2$) of the set of temporal transformations: $\tau_1(x_1)$ 212 and $\tau_2(x_1)$ 214. The same two temporal transformations are applied to $x_2$ 204 to generate two versions of $x_2$ 204: $\tau_1(x_2)$ 216 and $\tau_2(x_2)$ 218. Two versions of $x_3$ 206 are generated via the application of two other temporal transformations (e.g., $\tau_3$ and $\tau_4$) of the set of temporal transformations: $\tau_3(x_3)$ 220 and $\tau_4(x_3)$ 222. The application of temporal transformations to the training content are continued until two versions of each training content is generated. Note that in subsequent training iterations (and the first training iteration), in order to decrease systematic bias in the training, the assignment of temporal transformations to content and the assignment of the same temporal transformations to pairs of training content may be randomized, e.g., the assignments of temporal transformations to content and the pairing of content shown in FIG. 2 is non-limiting. Thus, the individual elements of the set of temporally transformed content 210 may be referenced by $\tau_j(x_i)$.

Each of the temporally transformed content samples may be non-temporally transformed also, to generate a set of temporally- and non-temporally transformed content 230. The set of non-temporally transformed content includes: $\sigma_1(\tau_1(x_1))$ 232, $\sigma_2(\tau_2(x_1))$ 234, $\sigma_3(\tau_1(x_2))$ 236, $\sigma_4(\tau_2(x_2))$ 238, $\sigma_5(\tau_3(x_3))$ 240, and $\sigma_6(\tau_4(x_3))$ 242. Thus, the individual elements of the set of non-temporally transformed content 230 may be referenced by $\sigma_k(\tau_j(x_i))$. In some embodiments, the content may not be transformed via the non-temporal transformations. The set of CNNs 224 are employed implement the representational model (e.g., F), to generate a set of representational vectors 250. The notation F ($\sigma_k(\tau_j(x_i))$) may be adopted to represent the vector representations. In some embodiments, the non-temporal transformations may omitted (in the notation) to simplify the notation. In such embodiments, the non-temporal transformations may be (but need not be) implemented, although their notation is omitted here to simplify the discussion. Thus, the two vector representations of the two versions of $x_1$ 202 may be referred to as $F(\tau_1(x_1))$ 252 and $F(\tau_2(x_1))$ 254, respectively. (e.g., the non-temporal transformations have been omitted to simplify the discussion). The two vector representations of the two versions of $x_2$ 204 may be referred to as $F(\tau_1(x_2))$ 256 and $F(\tau_2(x_2))$ 258, respectively. The two vector representations of the two versions of $x_3$ 206 may be referred to as $F(\tau_3(x_3))$ 260 and $F(\tau_4(x_3))$ 262, respectively.

A set of concatenated vectors 270 may be generated by concatenating the vector representations of each of two versions of each of the training contents. Thus, a concatenated vector may be generated for each of the input training contents. When generating the concatenated vectors, the column vectors may be transposed into row vectors and referenced as: $[F(\tau_p(x_i))^T, F(\tau_p(x_i))^T]$, where the indexes p and q refer to the corresponding temporal transformations. In some embodiments, two additional indexes may be introduced to notate the corresponding non-temporal transformations. In embodiments that omit the non-temporal indexes, the concatenated vector for $x_1$ 202 may be referenced as $[F(\tau_1(x_1))^T, F(\tau_2(x_1))^T]$ 272, the concatenated vector for $x_2$ 204 may be referenced as $[F(\tau_1(x_2))^T, F(\tau_2(x_2))^T]$ 274 and the concatenated vector for $x_3$ 206 may be referenced as $[F(\tau_3(x_3))^T, F(\tau_4(x_3))^T]$ 276. Note that these vectors correspond to a transformation in feature space, which corresponds to a temporal transformation. For example, each of the vectors: $[F(\tau_1(x_1))^T, F(\tau_2(x_1))^T]$ 272 and $[F(\tau_1(x_2))^T, F(\tau_2(x_2))^T]$ 274 corresponds to $\bar{\tau}_{1\rightarrow 2}$, which corresponds to $\tau_{1\rightarrow 2}$.

The set of MLPs 226 is trained (via this training method) to classify the concatenated vectors, based on the transformations in feature space that are encoded in the concatenated vectors. The set of MLPs 226 implement a representation model (e.g., $\psi$) that is trained to correlate the transformations in feature space and the (relative) temporal transformations, which generates the equivariance of the CNN model (e.g., F). Processing the set of concatenated vectors 270 via the set of MLPs 226 generates a set of relative (temporal) transformation vectors 290. Each vector of the set of relative transformation vectors 290 may be referenced as: $\psi_i^{p,q} \equiv \psi(F(\tau_q(x_i)^T, \tau_p(x_i)^T)) \in \mathbb{R}^D$, where each unique combination of indexes p and q indicate a unique relative transformation in feature space, which correlates to a unique relative temporal transformation of the input content indexed via i. Thus, the relative transformation vector for $x_1$ 202 may be referenced as $\psi_1^{1,2}$ 292, the relative transformation vector for $x_2$ 204 may be referenced as $\psi_2^{1,2}$ 294, and the relative transformation vector for $x_3$ 206 may be referenced as $\psi_3^{3,4}$ 296.

Because the desired equivariance of the model indicates that the relative transformations are independent of the input content, the model should be trained to increase a similarity metric between relative transformation vectors where the relative (temporal) transformation is the same, e.g., $\psi_i^{p,q} \approx \psi_j^{p,q}$, where i≠j. Additionally, the model should be trained to decrease a similarity metric between relative (temporal) transformation vectors where the relative transformation is different, e.g., $\psi_i^{p,q} \neq \psi_j^{r,s}$ for p, q≠r, s. Thus, a contrastive learning loss function may be defined, where pairs of relative transformation vectors that correspond to the same relative transformation are "attracted" (e.g. as indicated by the similarity metric) and pairs of relative transformation vectors that correspond to different relative transformations are "repelled" (e.g. as indicated by the similarity metric). That is, the contrastive learning loss function may implement "gravity" for positive-contrastive pairs of vectors (e.g., the vector-pair comprising $\psi_1^{1,2}$ 292 and $\psi_2^{1,2}$ 294) and "anti-gravity" for negative-contrastive pairs of vectors (e.g., the vector-pair comprising $\psi_1^{1,2}$ 292 and $\psi_3^{3,4}$ 296 and the vector-pair comprising $\psi_2^{1,2}$ 294 and $\psi_3^{3,4}$ 296). Accordingly, as shown by the labeled solid-arrows in FIG. 2 $\psi_1^{1,2}$ 292 and $\psi_2^{1,2}$ 294 should be attracted (e.g., the associated similarity metric is increased) when the set of weights of the models are updated (e.g., via backpropagation). As also shown by the labelled dotted-arrows, $\psi_1^{1,2}$ 292 and $\psi_3^{3,4}$ 296 should be repelled, as well as $\psi_2^{1,2}$ 294 and $\psi_3^{3,4}$ 296. As noted above, pairs of relative transformation vectors that are attracted in an iteration of the training may be referred to as positive-contrastive pairs. Pairs of relative transformation vectors that are repelled in an iteration of the training may be referred to as negative-contrastive pairs. Note that in subsequent iterations of training the model, the pairing of relative transformation vectors into positive-contrastive pairs and negative-contrastive pairs of vectors will vary.

In various embodiments, the similarity metric between a pair of relative transformation vectors (e.g., general vectors $\vec{x}$ and $\vec{y}$) may be based on a cosine similarity between the two vectors $$\left(\text{e.g., } \frac{\vec{x} \cdot \vec{y}}{\|\vec{x}\|_2 \cdot \|\vec{y}\|_2}\right),$$

where the "." indicates the conventional dot product (e.g., the inner product, as defined for vectors with real components) between two vectors. In at least some embodiments, the similarity metric may be based on an exponentiation of the cosine similarity between the two vectors. In various embodiments, the contrastive-learning loss function ($\mathcal{L}_{equi}$), where the subscript equi indicates the equivariance of the model, may be defined in terms of a similarity metric (d($\vec{x}$, $\vec{y}$)) for vector pair ($\vec{x}$, $\vec{y}$). In one non-limiting embodiment, the loss function may be defined as:

$$\mathcal{L}_{equi} = -\mathbb{E}\left[\log \frac{d(\psi_i^{p,q}, \psi_j^{p,q})}{d(\psi_i^{p,q}, \psi_j^{p,q}) + \Sigma_{r,s \ne p,q} d(\psi_i^{p,q}, \psi_k^{r,s})}\right],$$

where the expectation value ($\mathbb{E}$) is summed over the positive-contrastive pairs of vectors and the negative-contrastive pairs of vectors. To simplify the notation, the vector "arrow" has been dropped in the above expression. The negation of the expectation value is to turn the function into a loss function that is to be decreased, because in at least one embodiment, the similarity metric between pairs of vectors is negative. In this embodiment, the similarity metric may be defined as:

$$d(\vec{x}, \vec{y}) = \exp\left(\frac{1}{\lambda} \cdot \frac{\vec{x} \cdot stopgrad(\vec{y})}{\|\vec{x}\|_2 \|stopgrad(\vec{y})\|_2}\right),$$

where $\lambda$ is a temperature hyper-parameter of the training and the stopgrad notations indicates that gradients are not back-propagated for the second vector ($\vec{y}$). The temperature hyper-parameter may be bounded as: $0 < \lambda \le 1.0$. In at least one embodiment, $\lambda = 0.1$. In each iteration, the gradient of the loss function is backpropagated (for one of the vectors in the positive-contrastive vector pairs) to decrease the loss function.

The architecture 200 shown in FIG. 2 may enable receiving a set of temporally-varying content (e.g., a set of video content that includes $x_1$ 202, $x_2$ 204, and $x_3$ 206, as well as other additional video clips). A set of training content pairs may be generated. In the set of training content pairs, each training content included in the set of training content pairs may be included in a single training content pair of the set of training content pairs. For example, $x_1$ 202 and $x_2$ 204 may be included in a first training content pair, while $x_3$ 206 an $x_4$ (not shown in FIG. 2) may be included in a second training content pair. Additional training content pairs may be formed from additional training content not shown in FIG. 2. A (unique) pair of temporal transformations (e.g., randomly sampled from the set of temporal transformations) is assigned and/or associated with each training content pair from the set of training content pairs. For instance, a first pair of temporal transformations ($\tau_1$, $\tau_2$) is assigned to the first training content pair and a second pair of temporal transformations ($\tau_3$, $\tau_4$) is assigned to the second training content pair. Each pair of temporal transformations characterizes a relative temporal transformation applied to each of the training content included in the associated pair of training content. A separate pair of non-temporal transformation may be associated and/or assigned to each of the training content. For example, a first pair of non-temporal transformations ($\sigma_1$, $\sigma_2$) is assigned to $x_1$ 202, a second pair of non-temporal transformations ($\sigma_3$, $\sigma_4$) is assigned to $x_2$ 204, and a third pair of non-temporal transformations ($\sigma_5$, $\sigma_6$) is assigned to $x_3$ 206.

For each training content pair, two versions of each training content is generated based on applying each of the two associated temporal transformations to each of the training content included in the pair of training content. For example, each of ($\tau_1$, $\tau_2$) is applied to each of $x_1$ 202 and $x_2$ 204 to generate the $\tau_1(x_1)$ 212, $\tau_2(x_1)$ 214, $\tau_1(x_2)$ 216, and $\tau_2(x_2)$ 218. For each training content pair, the two versions of each training content may be updated based on an application of the non-temporal transformation associated with each of the training content included in the training content pair. For instance, the associated non-temporal transformations are applied to each of $\tau_1(x_1)$ 212, $\tau_2(x_1)$ 214, $\tau_1(x_2)$ 216, and $\tau_2(x_2)$ 218 to generate $\sigma_1(\tau_1(x_1))$ 232, $\sigma_2(\tau_1(x_2))$ 234, $\sigma_3(\tau_1(x_2))$ 236, $\sigma_4(\tau_2(x_2))$ 238, $\sigma_5(\tau_3(x_3))$ 240, and $\sigma_6(\tau_4(x_3))$ 242.

For each training content pair, a vector representation is generated for each updated version of each training content included in the pair of training content based on a representation model (e.g., F as implemented by the set of CNNs 224). For instance, the vector representations F ($\sigma_1(\tau_1(x_1))$) 252, F ($\sigma_2(\tau_1(x_2))$) 254, F ($\sigma_3(\tau_1(x_2))$) 256, F ($\sigma_4(\tau_2(x_2))$) 258, F ($\sigma_5(\tau_3(x_3))$) 260, and F ($\sigma_6(\tau_4(x_3))$) 262. For each training content pair, a concatenated vector is generated for each training content based on a combination (e.g., a concatenation) of the vector representations. For instance, for $x_1$ 202, the concatenated vector $[F(\tau_1(x_1))^T, F(\tau_2(x_1))^T]$ 272 may be generate. For $x_2$ 204, the concatenated vector $[F(\tau_1$ $(x_2))^T$, $F(\tau_2(x_2))^T$] 274 may be generated. For $x_3$ 206, the concatenated vector [$F(\tau_3(x_3))^T$, $F(\tau_4(x_3))^T$] 276 may be generated.

For each training content pair, a relative transformation vector may be generated (via MLP that implement a model $\psi$) for each training content. For instance, for $x_1$ 202, the relative transformation vector $\psi_1^{1,2}$ 292 may be generated. For $x_2$ 204, the relative transformation vector $\psi_2^{1,2}$ 294 may be generated. For $x_3$ 206, the relative transformation vector $\psi_3^{3,4}$ 296 may be generated. The weights of the models (e.g., F and $\psi$) may be updated based on the above contrastive-learning loss function and the similarity metric. When updating the weights, the contrastive-learning loss function attracts pairs of relative transformation vectors included in a common (or same) training content pair and repels pairs of relative transformation vectors that are included in separate training content pairs. The training process may be iterated until the models converged. That is, the training may continue until the values of the weights of F and $\psi$ converge to stable values. During each iteration, the pairing of the training content, as well as the associations of the temporal and non-temporal transformations to the training content may be subject to a random and/or stochastic process.

In some embodiments, auxiliary training may be performed on the model F. A classifier model (implemented by a NN not shown in FIG. 2) may be jointly trained with the set of CNNs 224 to classify the temporal transformations. In such embodiments, the classifier NN may be trained to classify a playback speed of the temporal transformations. The classifier NN may be trained (via self-supervised methods) to classify a playback speed (e.g., 1×, 2×, 4×, 8×, and the like), associated with the temporal transformation (e.g., $\tau$) based on the input vector $F(\tau(x))$. For example, via the representation model F, the classifier NN may classify $\tau_3(x_3)$ 132 of FIG. 1C and $\tau_3(x_4)$ 142 of FIG. 1C (and thus $\tau_3$) as being associated with a playback speed of 2×. In other embodiments, the classifier NN may associate $\tau_4(x_3)$ 134 of FIG. 1C and $\tau_4(x_4)$ 144 of FIG. 1C (and thus $\tau_4$) with a 1× playback speed. Such a classifier may be referred to as a "playback speed classifier." The playback speed classifier may take as input a vector (e.g., $F(\tau(x))$) and associate a playback speed of the temporally-transformed video clip $\tau(x)$ (or associate the playback speed with the temporal transform $\tau$). The playback speed classifier may be a non-linear classifier.

Another classifier NN model (e.g., a "playback direction classifier") may be trained to learn the playback direction associated with a temporal transformation. Again, the playback d NN classifier may be trained jointly with F, via self-supervised methods. For example, via the representation model F, the playback direction classifier NN may classify $\tau_3(x_3)$ 132 and $\tau_3(x_4)$ 142 (and thus $\tau_3$) as being associated with a "forward" playback direction. The playback direction classifier may associate $\tau_5(x_3)$ 136 of FIG. 1C and $\tau_5(x_4)$ 146 of FIG. 1C (and thus $\tau_4$) with a "reverse" playback direction. The playback direction classifier may be a binary classifier.

In some embodiments, still another classifier model may be jointly trained with the representational model to determine a temporal ordering of pairs "temporally shifted" clips, e.g., $(\tau_1(x_1), \tau_2(x_1))$ of FIG. 1B. The temporal-ordering classifier may classifier $\tau_1(x_1)$ 112 as occurring prior to $\tau_1(x_1)$ 114. The temporal-ordering classifier may classify the temporal shift between a pair of vectors $(\tau_p(x), \tau_q(x))$ into one of three classes: (1) the temporal shift between $\tau_1$ and $\tau_2$ is positive (e.g., $\tau_p(x)$ occurs before $\tau_q(x)$), (2) the temporal shift between $\tau_1$ and $\tau_2$ is negative (e.g., $\tau_p(x)$ occurs after $\tau_q(x)$), or (3) there is a temporal overlap between $\tau_1$ and $\tau_2$. For example, the temporal-ordering classifier may classify the pair of temporal clips $(\tau_3(x_3), \tau_4(x_3))$ of FIG. 1C, as well as the pair of temporal clips $(\tau_3(x_4), \tau_4(x_4))$ also of FIG. 1C, as belonging to e third category that indicates there is a temporal overlap in the paired clips. In some embodiments, the temporal-ordering classifier may receive a pair of concatenated vectors corresponding to the temporally shifted video clips, e.g., [$(F(\tau_p(x)))^T$, $(F(\tau_q(x)))^T$]. The temporal-ordering classifier may be a non-linear classier.

Figure 3:
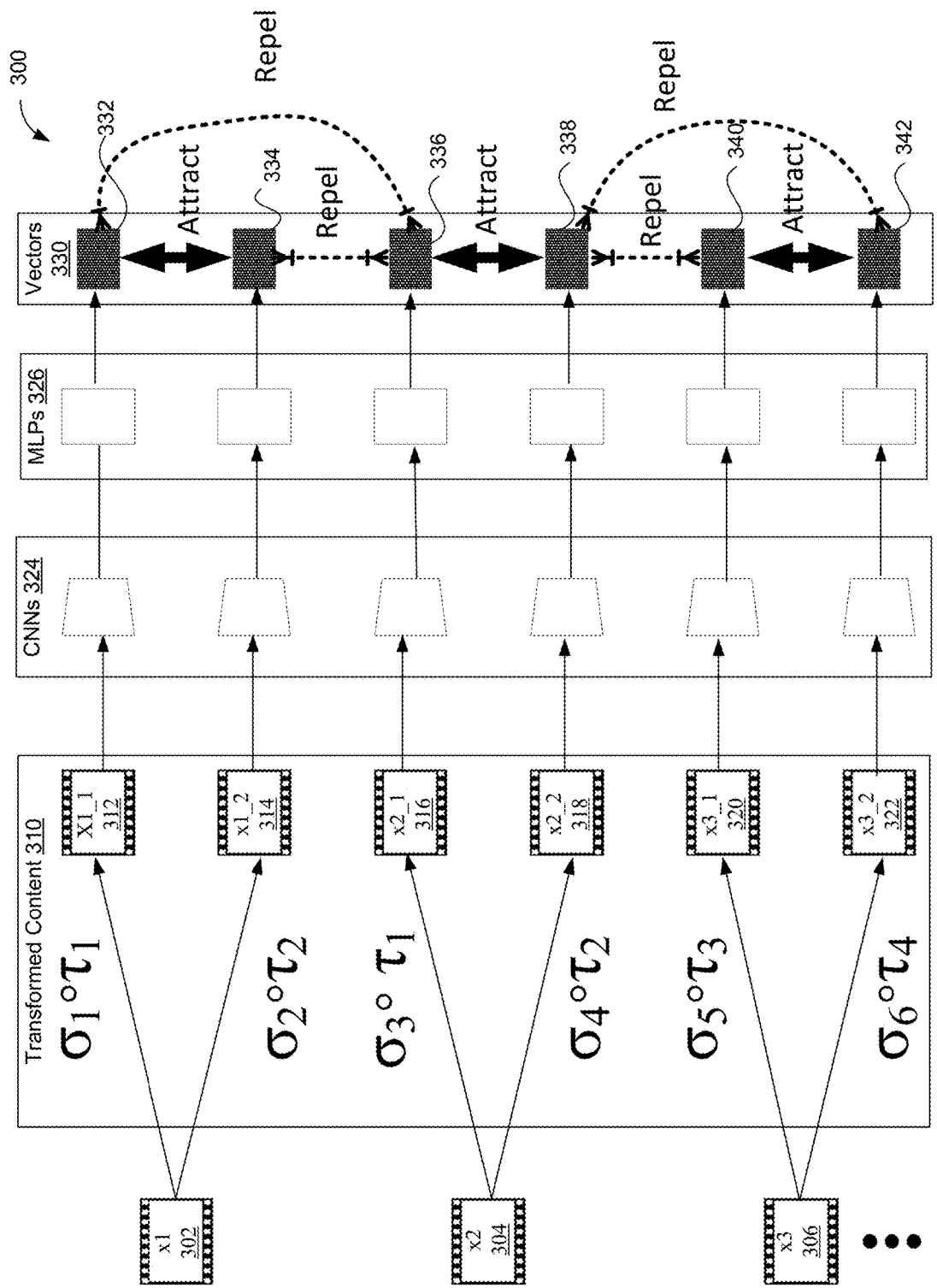
FIG. 3 illustrates an architecture for instance contrastive learning, in accordance with various embodiments.

FIG. 3 illustrates an architecture 300 for instance contrastive learning, in accordance to various embodiments. In some embodiments, it may be a goal of the training of the representational model (e.g., $F(x)$), such that $F(x)$ is sensitive to changes in the scene depicted in x. In such embodiments, in addition to the equivariant training architecture 200 of FIG. 2, $F(x)$ will be jointly trained via the training architecture 300 of FIG. 3, which introduces an instance contrastive learning objective, such that $F(x)$ is enabled to discriminate between separate instances of input content. A separate or supplementary training dataset may be generated, as shown in FIG. 3. Three instances of training content (e.g., $x_1$ 302, $x_2$ 304, and $x_3$ 306) are shown in FIG. 3. As with FIG. 2, additional instances of training content not shown may be included in the supplementary training dataset. Samples from the set of temporal transformations (e.g., $\mathcal{T}$) and the set of non-temporal transformations (e.g., $\mathcal{S}$) may be selected for each training content sample to generate transformed content 310.

More specifically, a temporal transformation (e.g., $\tau_p \in \mathcal{T}$) and two separate non-temporal transformations (e.g., $\sigma_p, \sigma_q \in \mathcal{S}$) are selected and/or sampled for each sample of training content. The selected transformations are applied to the associated content to generate instances of transformed content 310, e.g., $\tilde{x}_i^{p,q} = \sigma_q \circ \tau_p(x_i) = \sigma_q(\tau_p(x_i)) \in \mathbb{R}^D$. Due to the invariance of the model F to non-temporal transformations, the notation may be simplified by omitting the non-temporal transformation index (e.g., q): $\tilde{x}_i^p = \sigma_q \circ \tau_p(x_i) = \sigma_q(\tau_p(x_i))$. Accordingly, two (temporally and non-temporally) versions of each sample of training content may be generated. As shown in FIG. 3, the two versions of the $x_1$ 302 include $\sigma_1 \circ \tau_1(x_1) = x_{1,1}$ 312 and $\sigma_2 \circ \tau_2(x_1) = x_{1,2}$ 314. The two versions of the $x_2$ 304 include $\sigma_3 \circ \tau_1(x_2) = x_{2,1}$ 316 and $\sigma_4 \circ \tau_2(x_2) = x_{2,2}$ 318. The two versions of the $x_3$ 306 include $\sigma_5 \circ \tau_3(x_3) = x_{3,1}$ 320 and $\sigma_6 \circ \tau_4(x_3) = x_{3,2}$ 322. Each of the two versions of each training content is provided to a CNN (of the set of CNNs 324), which may implement the representational model (e.g., $F(x)$, which is the same model (and is being jointly trained) as implemented in the set of CNNs 224 of FIG. 2).

The representational vectors generated by the set of CNNs 326 are provided to a set of multilayer perceptrons (MLPs) 326, which implement another representations model (e.g., $\psi$). The MLP model $\psi$ may be a separate MLP model than the MLP model implemented by the set of MLPs 226 of FIG. 2, (e.g., $\psi$). The MLP model implemented by the set of MLPs 326 generates a vector for each of the two versions of each of the training content, as shown by the set of vectors 326. Using the above notation $\tilde{x}_i^{p,q} = \sigma_q \circ \tau_p(x_i) = \sigma_q(x_i))$, each MLP may transform the vector as: $\phi_i^p = \phi_i^p(F(\tilde{x}_i^p))$ As noted above, due to the invariance of F to non-temporal transformation, in some embodiments, the reference to the non-temporal index (e.g., d) may be omitted: $\phi_i^p = \phi_i^p(F(\tilde{x}_i^p))$. Employing this notation, the vector representation of $x_{1,1}$ 312 may be referenced as $\phi_1^{1,1}$ 332 and the vector representation of $x_{1,2}$ 314 may be referenced as $\phi_1^{1,2}$ 334. The vector representation of $x_{2,1}$ 316 may be referenced as $\phi_2^{2,3}$ 336 and the vector representation of $x_{2,2}$ 318 may be referenced as $\phi_2^{2,4}$ 338. The vector representation of $x_{3,1}$ 320 may be referenced as $\phi_3^{3,5}$ 340 and the vector representation of $x_{3,2}$ 320 may be referenced as $\phi_3^{3,6}$ 342.

Because the goal is to learn instance discrimination, the training should attract pairs of vectors of the same instances (e.g., those vectors representing the same content that have been similarly or dissimilarly transformed in the temporal domain) and repel pairs of vectors that are of different content and/or different temporal transformations. Thus, as shown in FIG. 3, the vector pairs of (vector 332, vector 334), (vector 336, vector 338), (vector 340, vector 342) are attracted, while other vector pairs are repelled.

On non-limiting example of a contrastive learning loss function that accomplishes such a goal is:

$$\mathcal{L}_{inst} = -\mathbb{E}\left[\log \frac{d(\phi_i^p, \phi_i^q)}{d(\phi_i^p, \phi_i^q) + \Sigma_{j \neq i} d(\phi_i^p, \phi_j^r)}\right],$$

where $d(\vec{x}, \vec{y})$ indicates the similarity metric (e.g., a cosine similarity) between the vector pair $(\vec{x}, \vec{y})$, as used above and the inst subscript indicates that this contrastive-learning function is used for instance contrastive learning, as shown in architecture 300.

The architecture 300 shown in FIG. 3 may enable receiving a set of temporally-varying content (e.g., a set of video content that includes $x_1$ 302, $x_2$ 304, and $x_3$ 306, as well as other additional video clips). To generate instances of content, a separate pair of non-temporal transformations may be associated with each input training content. For instance, a first pair of non-temporal transformations $(\sigma_1, \sigma_2)$ is associated with $x_1$ 302, a second pair of non-temporal transformations $(\sigma_3, \sigma_4)$ is associated with $x_2$ 304, and a third pair of non-temporal transformations $(\sigma_5, \sigma_6)$ is associated with $x_3$ 306. To create the separate instances of the same training content, a separate pair of temporal transformations is associated with each input training content. For example, a first temporal transformation $\tau_1$ and a second temporal transformation $\tau_2$ are associated with $x_1$ 302. The same (or different) pair of temporal transformations is associated with $x_2$ 304, and an another pair of temporal transformations is associated with $x_3$ 306. The associations of the non-temporal and the temporal transformations with the training content may be subject to a random and/or stochastic process. Furthermore, these associations may be re-generated via a randomization for each iteration in the training process.

Two versions of each training content may be generated based on an application of the associated temporal transformation and an application of the associated pair of transformations to the training content. For example, a first version ($x_{1,1}$ 312) of $x_1$ 302 is generated via $\sigma_1^\circ \tau_1(x_1)$ and a second version ($x_{1,2}$ 314) of $x_1$ 302 is generated via $\sigma_2^\circ \tau_2(x_1)$. A first version ($x_{2,1}$ 316) of $x_2$ 304 is generated via $\sigma_3^\circ \tau_1(x_2)$ and a second version ($x_{2,2}$ 318) of $x_2$ 304 is generated via $\sigma_4^\circ \tau_2(x_2)$. A first version ($x_{3,1}$ 320) of $x_3$ 306 is generated via $\sigma_5^\circ \tau_3(x_3)$ and a second version ($x_{3,2}$ 322) of $x_3$ 306 is generated via $\sigma_6^\circ \tau_4(x_3)$.

A vector representation may be generated for each version of each training content may be generated based on a representational model (e.g., F). A set of 3D CNNs (e.g., CNNs 234 and/or CNNs 334) may implement the representational model. For instance, each of $F(x_{1,1})$, $F(x_{1,2})$, $F(x_{2,1})$, $F(x_{2,2})$, $F(x_{3,1})$, and $F(x_{3,2})$ may be generated. An updated vector representation of each version of each training content may be generated based on an MLP model. The MLP model ($\phi$) may be implemented by a set of MLPs, including but not limited to set of MLPs 326. For instance, $\phi_1^{1,1}$ 332, $\phi_1^{1,2}$ 334, $\phi_2^{2,3}$ 336, $\phi_2^{2,4}$ 338, $\phi_3^{3,5}$ 340, and $\phi_3^{3,6}$ 342 may be generated. Note this MLP model ($\phi$) may be separate from the MLP model ($\psi$) of architecture 200 of FIG. 2. The representation model (e.g., F as implemented by both architecture 200 and 300) may be trained by jointly iterating over the training of architecture 200 and 300.

The weights of the models (F and $\phi$) may be updated based on a contrastive learning function that attracts pairs of vector representations for the same training content and repels pairs of vector representations for separate training content. Such a contrastive learning function is shown above. The training process may be iterated until the models converged. That is, the training may continue until the values of the weights of F and $\psi$ converge to stable values. During each iteration, the pairing of the training content, as well as the associations of the temporal and non-temporal transformations to the training content may be subject to a random and/or stochastic process.

Figure 4:
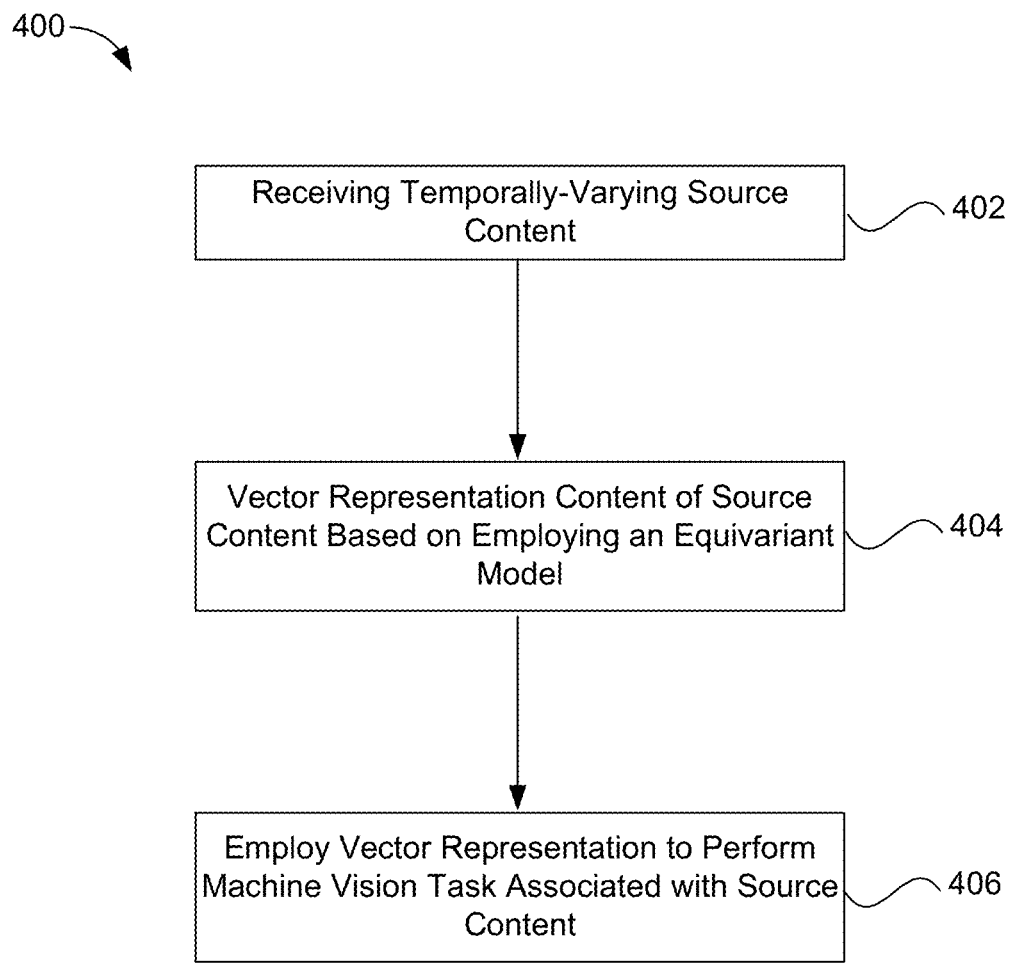
FIG. 4 illustrates one embodiment of a method for employing a representational model, which is consistent with the various embodiments presented herein.
Figure 5:
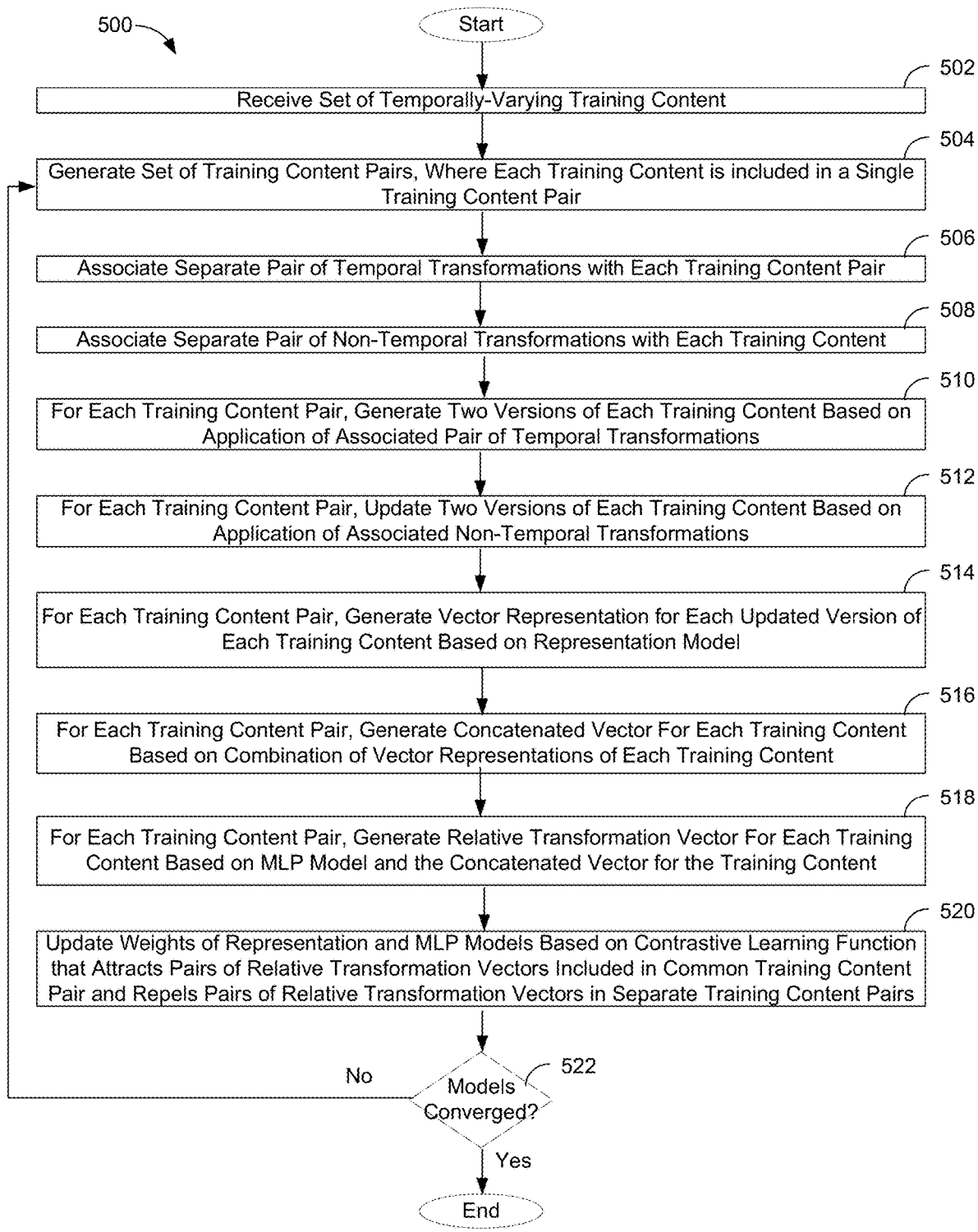
FIG. 5 illustrates one embodiment of a method for training a representational model, which is consistent with the various embodiments presented herein.
Figure 6:
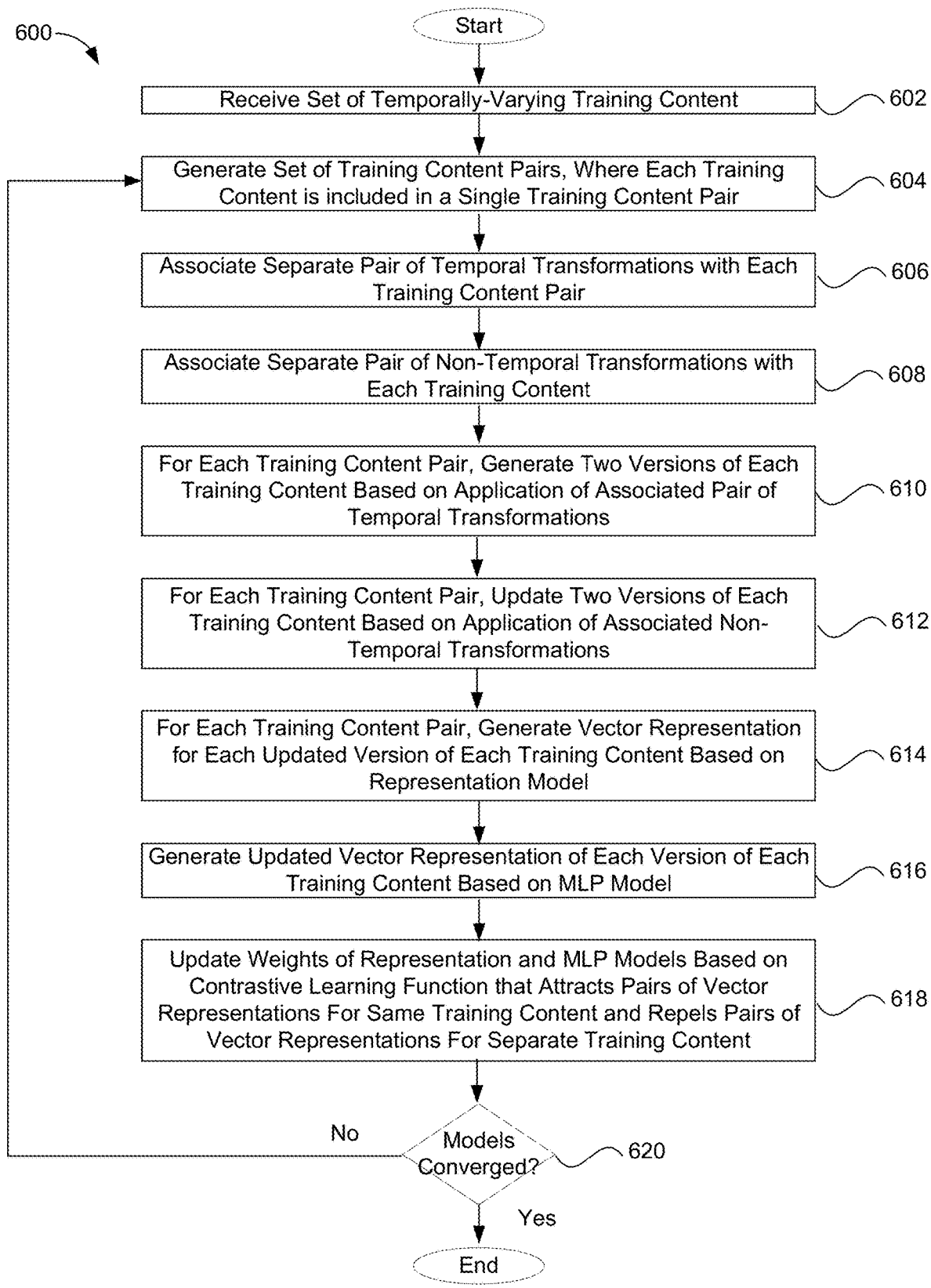
FIG. 6 illustrates one embodiment of a method for instance contrastive learning, which is consistent with the various embodiments presented herein.
Figure 7:
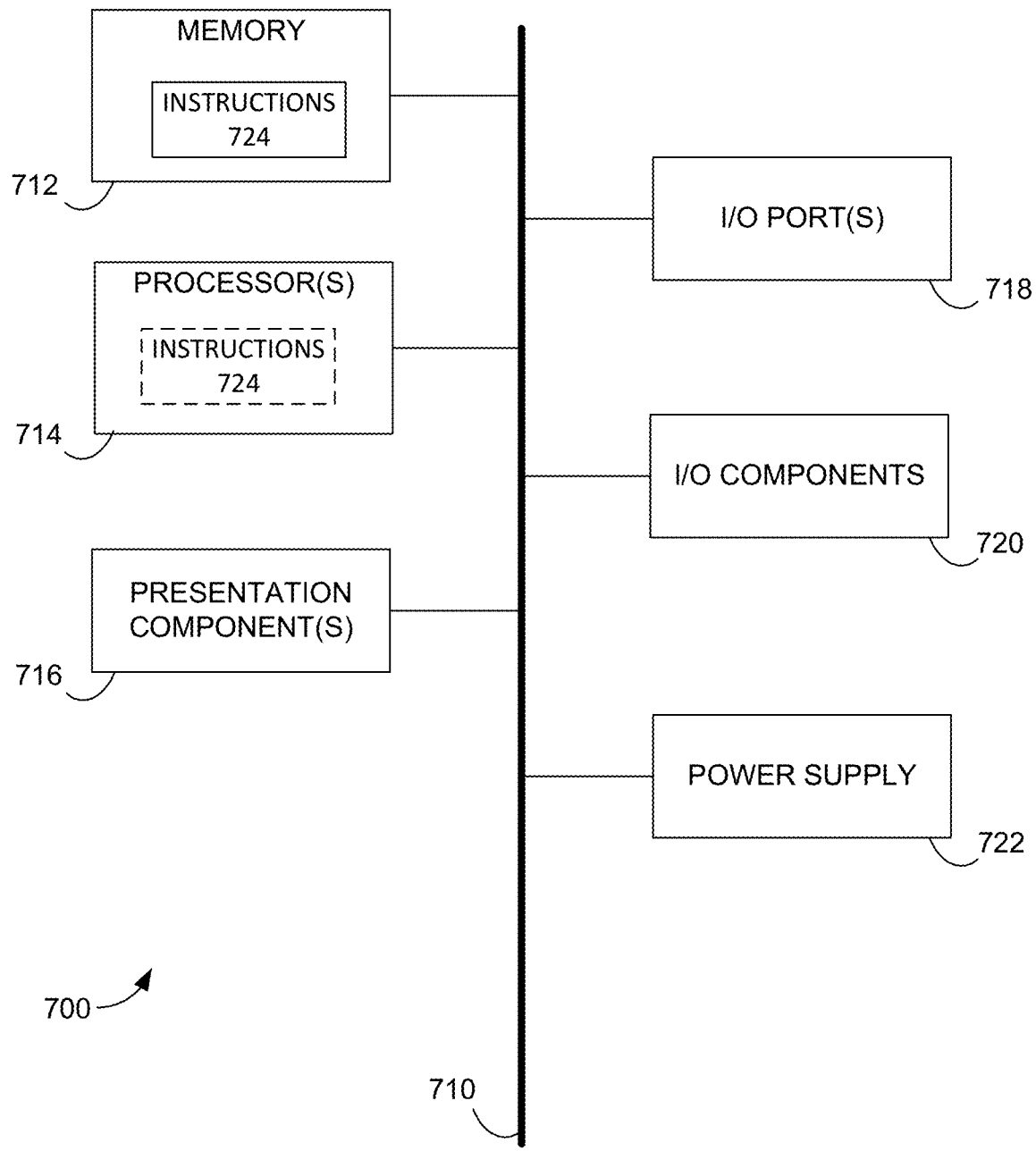
FIG. 7 is a block diagram of an example computing device in which embodiments of the present disclosure may be employed.

Generalized Processes for Training and Employing Equivariant Representational Models Processes 400-600 of FIGS. 4-6, or portions thereof, may be performed and/or executed by any computing device, such as but not limited to computing device 700 of FIG. 7. FIG. 4 illustrates one embodiment of a method 400 for employing a representational model, which is consistent with the various embodiments presented herein. Process 400 begins at block 402, where temporally-varying source content (e.g., a video clip) is received. At block 404, a vector representation of the source content is generated based on employing an equivariant model (e.g., F). At block 406, the vector representation of the source content is employed to perform a machine vision task associated with the source content. Some non-limiting examples of such machine vision tasks may include generating a response in a video search engine request or query. Target content associated with the source content may be identified, detected, and/or retrieved based on the vector representation of the source content. In other embodiments, the machine vision task may include identifying and/or detecting an action associated with (e.g., depicted within) the source content. For instance, the source content may include a video depicting of a diver diving from a diving board. The video may be labeled with the detected action of diving.

FIG. 5 illustrates one embodiment of a method 500 for training a representational model, which is consistent with the various embodiments presented herein. Method (or process) 500 may be implemented by the training architecture 200 of FIG. 2. Method 500 begins at block 502, where a set of temporally-varying source content (e.g., a set of training video clips) is received. At block 504, a set of training content pairs (from the set of training content) may be generated. Each training content of the set of training content may be included in a single training content pair. The pairing of the training content may be randomized for each iteration of process 500. At block 506, a separate pair of temporal transformations (from a set of temporal transformations) is associated with each training content pair. The associations of the pair of temporal transformations with each training content pair may be randomized for each iteration of process 500. At block 508, a separate pair of non-temporal transformations (from a set of non-temporal transformations) is associated with each training content of each training content pair. The associations of the pair of non-temporal transformations with each training content may be randomized for each iteration of process 500.

At block 510, for each training content pair, two versions of each training content may be generated based on an application of the associated pair of temporal transformations to the training content in the training content pair. At block 512, for each training content pair, the two versions of each training content is updated based on an application of the associated non-temporal transformation. At block 514, for each training content pair, a vector representation of each updated version of each training content may be generated. The vector representation for each updated version of the training content may be generated based on a representational model (e.g., F). At block 516, for each training content pair, a concatenated vector is generated for each training content of the pair. The concatenated vector may be based on a combination (e.g., a concatenation) of the vector representations of each training content. At block 518, for each training content pair, a relative transformation vector may be generated for each training content based on an MLP model and the concatenated vector for the training content.

At block 520, the weights of the representational model and the MPL model may be update based on a contrastive learning loss function. The contrastive learning loss function may attract pairs of relative transformation vectors that are included in a common training content pair and repels pairs of relative transformation vectors that are in separate training content pairs. At decision block 522, it is determined whether the models (e.g., the weights of the models) have converged. If the models have converged, the training of the models may be terminated. If the models have not converged, then method 500 may return to block 504 to begin another iteration of method 500. In at least one embodiment, process 500 may flow to process 600 such that the representational model is jointly trained by method 500 and method 600.

FIG. 6 illustrates one embodiment of a method 600 for instance contrastive learning, which is consistent with the various embodiments presented herein. Method 600 may be implemented by the training architecture 300 of FIG. 3. The representational model (e.g., F) may be trained via a joint, serial, and/or parallel implementation of method 500 and method 600. Method (or process) 600 begins at block 602, where a set of temporally-varying source content (e.g., a set of training video clips) is received. The set of training content may be equivalent to the set of training content employed in method 500. In at least one embodiment, the set of training content of block 602 may be a (random) subset of the set of training content received in block 502.

At block 604, a set of training content pairs (from the set of training content) may be generated. Each training content of the set of training content may be included in a single training content pair. The pairing of the training content may be randomized for each iteration of process 600. At block 606, a separate pair of temporal transformations (from a set of temporal transformations) is associated with each training content pair. The associations of the pair of temporal transformations with each training content pair may be randomized for each iteration of process 600. At block 608, a separate pair of non-temporal transformations (from a set of non-temporal transformations) is associated with each training content of each training content pair. The associations of the pair of non-temporal transformations with each training content may be randomized for each iteration of process 600.

At block 610, for each training content pair, two versions of each training content may be generated based on an application of the associated pair of temporal transformations to the training content in the training content pair. At block 612, for each training content pair, the two versions of each training content is updated based on an application of the associated non-temporal transformation. At block 614, for each training content pair, a vector representation of each updated version of each training content may be generated. The vector representation for each updated version of the training content may be generated based on a representational model (e.g., F, the same model applied at block 514 of method 500). Note that method 500 and 600 are similar up to blocks 514 and 614 respectively. Thus, in some embodiments, a single method may be implemented that executes these block, and forks at block 514/614. At the fork, method 500 may continue with block 516 and method 600 may continue with block 616. Note that methods 500 and 600 employ separate MLP models and separate loss functions.

At block 616, the vector representation of each version of each training content is updated based on a MLP model. Note that the representation model implemented by methods 500 and 600 may be a common representational model (at blocks 514 and 614 respectively), while the MLP models (block 516 and 616 respectively) implemented in methods 500 and 600 may be separate MLP models. At block 616, the weights of the representational and MLP models may be updated based on a contrastive learning loss function. The contrastive learning loss function may attract pairs of vector representations for the same training content and repels pairs of vector representations for separate training content. At decision block 618, it is determined whether the models (e.g., the weights of the models) have converged. If the models have converged, the training of the models may be terminated. If the models have not converged, then method 600 may return to block 604 to begin another iteration of method 600. In at least one embodiment, process 600 may flow to process 500 such that the representational model is jointly trained by method 500 and method 600.

Additional Embodiments

Other embodiments include a method that includes receiving source content that varies across a temporal domain. A vector representation of at least a portion of the source content may be generated. Generated the vector representation of the source content may be based on employing a model that is equivariant with respect to a set of temporal transformations. The set of temporal transformations may be applicable to the source content across the temporal domain. Based on the representation of the source content, at least one of target content associated with the source content or an action associated with the source content may be identified.

In some embodiments, the model may be a representational model that is trained according to another method that includes applying a first temporal transformation of the set of temporal transformations to first training content (e.g., of a set of training content) that varies across the temporal domain. A first vector may be generated based on the model. The first vector may be a vector representation of the temporally-transformed first training content. The first temporal transformation may be applied to second training content (of the set of training content) that varies across the temporal domain. A second vector may be generated based on the model. The second vector may be a vector representation of the temporally-transformed second training content. A set of weights of the model may be adjusted and/or updated based on the first vector and the second vector. Adjusting the set of weights of the model may increase a first similarity metric (e.g., a cosine similarity metric) that is associated with the first vector and the second vector, when the first and second vectors are re-generated based on the model with the adjusted set of weights.

In some embodiments, the training method further includes applying a third temporal transformation of the set of temporal transformations to third training content that varies across the temporal domain. A third vector may be generated based on the model. The third vector may be a vector representation of the temporally-transformed third training content. The set of weights of the model may be adjusted based on the first vector and the third vector. Adjusting the set of weights decreases a second similarity metric that is associated with the first vector and the third vector, when the first and third vectors are re-generated based on the model with the adjusted set of weights.

The training model may further include applying a first non-temporal transformation of a set of non-temporal transformations to the temporally-transformed first training content to generate temporally- and non-temporally transformed first training content. The first vector may be generated based on the temporally- and non-temporally-transformed first training content. The first vector may be a vector representation of the temporally- and non-temporally-transformed first training content. A second non-temporal transformation of the set of non-temporal transformations may be applied to the temporally-transformed second training content to generate temporally- and non-temporally-transformed second training content. The second vector may be generated based on the temporally- and non-temporally-transformed second training content. The second vector may be a vector representation of the temporally- and non-temporally-transformed second training content.

The first training content may be or may include first video content. The first temporal transformation may be associated with a first playback speed (of the first video content). The second training content may be or may include second video content. The second temporal transformation may be associated with a second playback speed (of the second video content). The training method may include training a classifier model to classify the first vector as being associated with the first playback speed and to classify the second vector as being associated with the second playback speed.

In another embodiment, the first temporal transformation may be associated with a forward playback direction (of the first video content). The second temporal transformation may be associated with a reverse playback direction (of the second video content). A classifier model may be trained to classify the first vector as being associated with the forward playback direction and to classify the second vector as being associated with the reverse playback direction.

In still another embodiment, the first temporal transformation may be associated with a first temporal clipping (of the first video content). The second temporal transformation may be associated with a second temporal clipping (of the second video content). A classifier model may be trained to classify a concatenation of the first vector and the second vector as being one of a first non-overlapping temporal ordering of the first and second temporal clippings, a second non-overlapping temporal ordering of the first and second temporal clippings, or an overlapping temporal ordering of the first and second temporal clippings.

Another training method of a model may include accessing first content and second content that both vary across a temporal domain and a non-temporal domain of the contents. A first transformed version of the first content may be generated by applying a first temporal transformation, of a set of temporal transformations, to the first content. A first transformed version of the second content may be generated by applying the first temporal transformation to the second content. A first vector may be based on the model (under training) and the first transformed version of the first content. A second vector may be generated based on the model and the first transformed version of the second content. The first and second vectors may be associated with each other as a positive-contrastive vector pair. The (weights of the) model may be updated and/or adjusted. The model may be updated based on a contrastive-learning loss function such that a first similarity metric associated with the positive-contrastive vector pair is increased and the updated model is equivariant to the first temporal transformation.

The method may further include accessing third content that varies across the temporal domain and the non-temporal domain of the contents. A first transformed version of the third content may be generated by applying a second temporal transformation, of the set of temporal transformations, to the third content. A third vector may be generate based on the model and the first transformed version of the third content. The first and third vectors may be associated with each other as a negative-contrastive vector pair. The model may be updated based on the contrastive learning loss function such that a second similarity metric associated with the negative-contrastive vector pair is decreased and the updated model is equivariant to the second temporal transformation.

The training method may further include generating a second transformed version of the first content by applying a second temporal transformation, of the set of temporal transformations, to the first content. A second transformed version of the second content may be generated by applying the second temporal transformation to the second content. A third vector may be generate based on the model and the first transformed version of the first content. A fourth vector may be generated based on the model and the second transformed version of the first content. A fifth vector may be generated based on the model and the first transformed version of the second content. A sixth vector may be generated based on the model and the second transformed version of the second content. The first vector may be based on a concatenation of the third vector and the fourth vector. The second vector may be generated based on a concatenation of the fifth vector and the sixth vector. Updating the model may be such that the updated model is equivariant to the second temporal transformation.

In some embodiments, the training method includes generating a third transformed version of the first content by applying a first non-temporal transformation, of a set of non-temporal transformations, to the first transformed version of the first content. A third transformed version of the second content may be generated by applying a second non-temporal transformation, of the set of non-temporal transformations, to the first transformed version of the second content. The third vector may be generated based on the model and the third transformed version of the first content. The fifth vector may be generated based on the model and the third transformed version of the second content. Updating the model may include updating the model such that the updated model is invariant to the first and second non-temporal transformations.

In some embodiments, the training method further includes generating a fourth transformed version of the first content by applying a third non-temporal transformation, of the set of non-temporal transformations, to the second transformed version of the first content. A fourth transformed version of the second content may be generated by applying a fourth non-temporal transformation, of the set of non-temporal transformations, to the second transformed version of the second content. The fourth vector may be generated based on the model and the fourth transformed version of the first content. The sixth vector may be generated based on the model and the fourth transformed version of the second content. The model may be updated such that the updated model is invariant to the third and fourth non-temporal transformations.

In at least one embodiment, the training method may further include generating a seventh vector based on a concatenation of the third and fourth vectors. An eight vector may be generated based on a concatenation of the fifth and sixth vectors. The first vector may be generated based on a multilayer perceptron model applied to the seventh vector. The first vector may encode a first relative temporal transformation, based on a combination of the first and second temporal transformations, applied to the first content. The second vector may be generated based on the multilayer perceptron model applied to the eight vector. The second vector may encode the first relative temporal transformation applied to the second content.

Still another training method includes generating first transformed content by applying a first temporal transformation (e.g., of a set of temporal transformations) to first content (e.g., of a set of training content). Second transformed content may be by applying the first temporal transformation to second content (e.g., of the set of training content). Third transformed content may be generated by applying a second temporal transformation (e.g., of the set of temporal transformations) to third content (e.g., of the set of training content). A representation (e.g., a vector representation) of the first content may be generated by applying a model to the first transformed content. A representation of the second content may be generated by applying the model to the second transformed content. A representation of the third content may be generated by applying the model to the third transformed content. The model may be updated and/or adjusted to increase a similarity (e.g., a cosine similarity metric) between the representation of the first content and the representation of the second content and to decrease a similarity between the representation of the first content and the representation of the third content.

The trained method (e.g., the updated model) may be employed by receiving source content. A representation (e.g., a vector representation) of the source content may be generated by applying the updated model to at least a portion of the source content. Based on the representation of the source content, other content that corresponds to the source content may be identified. In other embodiments, the updated and/or trained model may be employed by identifying, based on the representation of the source content, an action depicted in the source content.

The trained (or updated) model may be employed by receiving a temporally transformed version of first source content. A temporally transformed version of second source content may be received. Based on the updated model, the temporally transformed version of the first source content, and the temporally transformed version of second source content, a relative temporal transformation that was applied to each of the first source content and the second source content may be determined. The relative temporal transformation may be associated with at least one of a playback speed or a playback direction.

In some embodiments, the trained (or updated) model may be employed by receiving a first portion of video content. A second portion of the video content may be received. Based on the updated model, a temporal ordering of the first portion of the video content and the second portion of the video content may be determined.

Illustrative Computing Device

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 may be non-transitory memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)".

What is claimed is:

1. A non-transitory computer-readable storage medium having instructions stored thereon, which, when executed by a processor of a computing device cause the computing device to perform actions comprising:
    receiving source content that varies across a temporal domain;
    generating a vector representation of at least a portion of the source content by employing a model that was trained by applying a set of temporal transformations to a set of temporally-varying training content such that the trained model is equivariant with respect to the set of temporal transformations being applied to the source content; and
    identifying, based on the vector representation of the source content, at least one of target content associated with the source content or an action associated with the source content.

2. The non-transitory computer-readable storage medium of claim 1, wherein the model was trained to be equivariant with respect to the set of temporal transformations being applied to the source content by:

applying a first temporal transformation of the set of temporal transformations to first training content of the set of temporally-varying training content;

generating a first vector based on the model, wherein the first vector is a vector representation of the temporally-transformed first training content;

applying the first temporal transformation to second training content of the set of temporally-varying training content that varies across the temporal domain;

generating a second vector based on the model, wherein the second vector is a vector representation of the temporally-transformed second training content; and adjusting a set of weights of the model based on the first vector and the second vector, wherein adjusting the set of weights increases a first similarity metric that is associated with the first vector and the second vector, when the first and second vectors are re-generated based on the model with the adjusted set of weights.

3. The non-transitory computer-readable storage medium of claim 2, wherein the model was trained by:

applying a second temporal transformation of the set of temporal transformations to third training content of the set of temporally-varying training content that varies across the temporal domain;

generating a third vector based on the model, wherein the third vector is a vector representation of the temporally-transformed third training content; and adjusting the set of weights of the model based on the first vector and the third vector, wherein adjusting the set of weights of the model decreases a second similarity metric that is associated with the first vector and the third vector, when the first and third vectors are re-generated based on the model with the adjusted set of weights.

4. The non-transitory computer-readable storage medium of claim 2, wherein the model was trained by:

applying a first non-temporal transformation of a set of non-temporal transformations to the temporally-transformed first training content to generate temporally- and non-temporally transformed first training content;

generating the first vector based on the temporally- and non-temporally-transformed first training content, wherein the first vector is a vector representation of the temporally-transformed and non-temporally-transformed first training content;

applying a second non-temporal transformation of the set of non-temporal transformations to the temporally-transformed second training content to generate temporally- and non-temporally-transformed second training content; and generating the second vector based on the temporally- and non-temporally-transformed second training content, wherein the second vector is a vector representation of the temporally- and non-temporally- transformed second training content.

5. The non-transitory computer-readable storage media of claim 2, wherein the first training content is first video content, the first temporal transformation is associated with a first playback speed, the second training content is second video content, and the second temporal transformation is associated with a second playback speed, and the model was trained by:

jointly adjusting the set of weights of the model and another set of weights of a classifier model, such that the classifier model classifies the first vector as being associated with the first playback speed and classifies the second vector as being associated with the second playback speed.

6. The non-transitory computer-readable storage media of claim 2, wherein the first training content is first video content, the first temporal transformation is associated with a forward playback direction, the second training content is second video content, and the second temporal transformation is associated with a reverse playback direction, and the model was trained by:

jointly adjusting the set of weights of the model and another set of weights of a classifier model, such that the classifier model classifies the first vector as being associated with the forward playback direction and classifies the second vector as being associated with the reverse playback direction.

7. The non-transitory computer-readable storage media of claim 2, wherein the first training content is first video content, the first temporal transformation is associated with a first temporal clipping, the second training content is the first video content, and the second temporal transformation is associated with a second temporal clipping, and the model was trained by:

jointly adjusting the set of weights of the model and another set of weights of a classifier model, such that the trained classifier model classifies a concatenation of the first vector and the second vector as being one of a first non-overlapping temporal ordering of the first and second temporal clippings, a second non-overlapping temporal ordering of the first and second temporal clippings, or an overlapping temporal ordering of the first and second temporal clippings.

8. A method comprising:

accessing first content that varies across a temporal domain and a non-temporal domain;

accessing second content that varies across the temporal domain and the non-temporal domain;

generating a first transformed version of the first content by applying a first temporal transformation, of a set of temporal transformations, to the first content;

generating a first transformed version of the second content by applying the first temporal transformation to the second content;

generating a first vector based on a model and the first transformed version of the first content, wherein the model was trained by applying a set of temporal transformations to a set of temporally-varying training content such that the trained model is equivariant with respect to the set of temporal transformations;

generating a second vector based on the model and the first transformed version of the second content;

associating the first and second vectors as a positive-contrastive vector pair; and updating the model based on a contrastive-learning loss function such that a first similarity metric associated with the positive-contrastive vector pair is increased; and wherein the model was trained to be equivariant with respect to the set of temporal transformations being applied to the first content and the second content by:

applying a first temporal transformation of the set of temporal transformations to first training content of the set of temporally-varying training content;

generating a first vector based on the model, wherein the first vector is a vector representation of the temporally-transformed first training content;

applying the first temporal transformation to second training content of the set of temporally-varying training content that varies across the temporal domain;
generating a second vector based on the model, wherein the second vector is a vector representation of the temporally-transformed second training content; and
adjusting a set of weights of the model based on the first vector and the second vector, wherein adjusting the set of weights increases a first similarity metric that is associated with the first vector and the second vector, when the first and second vectors are re-generated based on the model with the adjusted set of weights.

9. The method of claim 8, further comprising:
generating a second transformed version of the first content by applying a second temporal transformation, of the set of temporal transformations, to the first content;
generating a second transformed version of the second content by applying the second temporal transformation to the second content;
generating a third vector based on the model and the first transformed version of the first content;
generating a fourth vector based on the model and the second transformed version of the first content;
generating a fifth vector based on the model and the first transformed version of the second content;
generating a sixth vector based on the model and the second transformed version of the second content;
generating the first vector based on a concatenation of the third vector and the fourth vector; and
generating the second vector based on a concatenation of the fifth vector and the sixth vector, and wherein
increasing the first similarity metric associated with the positive-contrastive pair increases an equivariance of the model with respect to a first relative temporal transformation that is based on a combination of the first and second temporal transformations.

10. The method of claim 9, further comprising:
generating a third transformed version of the first content by applying a first non-temporal transformation, of a set of non-temporal transformations, to the first transformed version of the first content;
generating a third transformed version of the second content by applying a second non-temporal transformation, of the set of non-temporal transformations, to the first transformed version of the second content;
generating the third vector based on the model and the third transformed version of the first content; and
generating the fifth vector based on the model and the third transformed version of the second content.

11. The method of claim 10, further comprising:
generating a fourth transformed version of the first content by applying a third non-temporal transformation, of the set of non-temporal transformations, to the second transformed version of the first content;
generating a fourth transformed version of the second content by applying a fourth non-temporal transformation, of the set of non-temporal transformations, to the second transformed version of the second content;
generating the fourth vector based on the model and the fourth transformed version of the first content; and
generating the sixth vector based on the model and the fourth transformed version of the second content.

12. The method of claim 11, further comprising:
generating a seventh vector based on the concatenation of the third and fourth vectors;
generating an eight vector based on the concatenation of the fifth and sixth vectors;
generating the first vector based on a multilayer perceptron model applied to the seventh vector, wherein the first vector encodes the first relative temporal transformation applied to the first content; and
generating the second vector based on the multilayer perceptron model applied to the eight vector, wherein the second vector encodes the first relative temporal transformation applied to the second content.

13. The method for claim 8, further comprising:
accessing third content that varies across the temporal domain and the non-temporal domain;
generating a first transformed version of the third content by applying a second temporal transformation, of the set of temporal transformations, to the third content;
generating a third vector based on the model and the first transformed version of the third content;
associating the first and third vectors as a first negative-contrastive vector pair; and
updating the model based on the contrastive-learning loss function such that a second similarity metric associated with the first negative-contrastive vector pair is decreased.

14. The method for claim 13, further comprising:
associating the second and third vectors as a second negative-contrastive vector pair; and
updating the model based on the contrastive-learning loss function such that a third similarity metric associated with the second negative-contrastive vector pair is decreased.

15. A computing system for mapping input data onto a target schema, comprising:
a processor device; and
a computer-readable storage medium, coupled with the processor device, having instructions stored thereon, which, when executed by the processor device, perform actions comprising:
generating first transformed content by applying a first temporal transformation to first content;
generating second transformed content by applying the first temporal transformation to second content;
generating a first representation of the first content based on a convolutional neural network (CNN) model and the first transformed content, wherein the CNN model was trained by applying a set of temporal transformations to a set of temporally-varying training content such that the trained model is equivariant with respect to the set of temporal transformations;
generating a first representation of the second content based on the CNN model and the second transformed content; and
updating the CNN model to increase a first similarity metric that is associated with the first representation of the first content and the first representation of the second content.

16. The computing system of claim 15, wherein the actions further comprising:
generating the first representation of the first content and the first representation of the second content further based on a first multilayer perceptron (MLP) model; and
jointly updating the first MLP model and the CNN model to increase the first similarity metric.

17. The computing system of claim 16, wherein the actions further comprise:
  generating a second representation of the first content based on the CNN model, a second MLP model, and the first transformed content;
  generating third transformed content by applying a second temporal transformation to first content;
  generating a third representation of the first content based on the CNN model, the second MLP model, and the third transformed content; and
  jointly updating the second MLP model and the CNN model to increase a second similarity metric that is associated with the second representation of the first content and the third representation of the first content.

18. The computing system of claim 17, wherein the actions further comprise:
  generating a second representation of the second content based on the CNN model, the second MLP model, and the second transformed content;
  generating fourth transformed content by applying the second temporal transformation to second content;
  generating a third representation of the second content based on the CNN model, the second MLP model, and the fourth transformed content; and
  jointly updating the second MLP model and the CNN model to decrease a third similarity metric that is associated with the second representation of the first content and the second representation of the second content.

19. The computing system of claim 15, wherein the actions further comprise:
  generating third transformed content by applying a second temporal transformation to third content;
  generating a first representation of the third content based on the CNN model and the third transformed content; and
  updating the CNN model to decrease a second similarity metric that is associated with the first representation of the first content and the first representation of the third content.

20. The computing system of claim 15, wherein the actions further comprise:
  generating the first transformed content by further applying a first non-temporal temporal transformation to the first content;
  generating the second transformed content by further applying a second non-temporal transformation to second content;
  generating the first representation of the first content further based on a second temporal transformation and a third non-temporal transformation applied to the first content; and
  generating the first representation of the second content further based on the second temporal transformation and a fourth non-temporal transformation applied to the second content.

* * * * *